(12) United States Patent
Wu et al.

(10) Patent No.: US 11,533,610 B2
(45) Date of Patent: Dec. 20, 2022

(54) KEY GENERATION METHOD AND RELATED APPARATUS

(71) Applicant: Huawei Technologies Co., Ltd., Shenzhen (CN)

(72) Inventors: Rong Wu, Shenzhen (CN); Bo Zhang, Shenzhen (CN); Shuaishuai Tan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 120 days.

(21) Appl. No.: 17/031,534

(22) Filed: Sep. 24, 2020

(65) Prior Publication Data

US 2021/0058771 A1 Feb. 25, 2021

Related U.S. Application Data

(63) Continuation of application No. PCT/CN2019/079331, filed on Mar. 22, 2019.

(30) Foreign Application Priority Data

Mar. 26, 2018 (CN) .......................... 201810254839.6

(51) Int. Cl.
*H04W 12/033* (2021.01)
*H04L 9/08* (2006.01)
*H04W 12/10* (2021.01)

(52) U.S. Cl.
CPC ......... *H04W 12/033* (2021.01); *H04L 9/0861* (2013.01); *H04W 12/10* (2013.01)

(58) Field of Classification Search
CPC . H04W 12/033; H04W 12/10; H04W 88/085; H04W 12/041; H04W 12/0431;
(Continued)

(56) References Cited

U.S. PATENT DOCUMENTS

2005/0117587 A1 6/2005 Kawato
2016/0344641 A1 11/2016 Javidi et al.
(Continued)

FOREIGN PATENT DOCUMENTS

CN 102802036 A 11/2012
CN 102369765 B 2/2014
(Continued)

OTHER PUBLICATIONS

Huawei et al., "Security for CU-CP and CU-UP split," 3GPP TSG SA WG3 (Security) Meeting #90Bis, San Diego, USA, S3-180659, XP051409085, total 2 pages, 3rd Generation Partnership Project, Valbonne, France (Feb. 26-Mar. 2, 2018).
(Continued)

*Primary Examiner* — Mazda Sabouri
(74) *Attorney, Agent, or Firm* — Leydig, Voit & Mayer, Ltd.

(57) ABSTRACT

Embodiments of this application provide a key generation method, applied to a scenario in which a base station is divided into a centralized unit and a distributed unit and a control plane and a user plane of the centralized unit are separated. And the control plane entity of the centralized unit obtains a root key, generates a user plane security key based on the root key, and sends the first user plane security key to the user plane entity of the first centralized unit. According to this application, key isolation between different user plane entities is implemented. Further, in an actual operation, the control plane entity or the user plane entity of the centralized unit may be flexibly selected to generate the user plane security key.

17 Claims, 17 Drawing Sheets

(58) Field of Classification Search
CPC ....... H04L 9/0861; H04L 9/08; H04L 9/0869; H04L 9/089
See application file for complete search history.

(56) References Cited

U.S. PATENT DOCUMENTS

| | | | |
|---|---|---|---|
| 2018/0084464 A1* | 3/2018 | Ozturk | .............. H04W 36/0069 |
| 2018/0213403 A1* | 7/2018 | Shi | ......................... H04W 12/02 |

FOREIGN PATENT DOCUMENTS

| | | |
|---|---|---|
| CN | 106162730 A | 11/2016 |
| CN | 106375992 A | 2/2017 |
| CN | 107371155 A | 11/2017 |
| WO | 2017123359 A1 | 7/2017 |
| WO | 2018009340 A1 | 1/2018 |

OTHER PUBLICATIONS

Vodafone Group, "Security Solution of CP-UP Split Architecture," 3GPP TSG-RAN WG3 NR Ad-Hoc 1801, Sophia Antipolis, France, R3-180323, XP051387303, total 8 pages, 3rd Generation Partnership Project, Valbonne, France (Jan. 22-26, 2018).

"3rd Generation Partnership Project; Technical Specification Group Radio Access Network; Study of separation of NR Control Plane (CP) and User Plane (UP) for split option 2; (Release 15)," 3GPP TR 38.806 V15.0.0, XP051392782, total 22 pages, 3rd Generation Partnership Project, Valbonne, France (Dec. 2017).

ZTE, "Discussion on security key generation for E1 interface," 3GPP TSG RAN WG3 NR ADHOC, Sophia-Antipolis, France, R3-180129, total 3 pages, 3rd Generation Partnership Project, Valbonne, France (Jan. 22-26, 2018).

LG Electronics, "Discussion on UP security key for CU-CP UP separation," 3GPP TSG SA WG3 (Security) Meeting #90Bis, S3-180665, San Diego (US), total 1 page, 3rd Generation Partnership Project, Valbonne, France (Feb. 26-Mar. 2, 2018).

"Security Aspects for CU-UP," 3GPP TSG-RAN WG3 NR AdHoc 1801, Sophia Antipolis, France, R3-180260, pp. 1-2, 3rd Generation Partnership Project, Valbonne, France (Jan. 22-26, 2018).

"3rd Generation Partnership Project; Technical Specification Group Services and System Aspects; Pilot development of Security Assurance Specification (SCAS) for MME network product class (Release 13)," 3GPP TR 33.806 V0.9.0, pp. 1-166, 3rd Generation Partnership Project, Valbonne, France (Jun. 2015).

"Discussions on Security handling for CP-UP separation," 3GPP TSG-RAN3 Meeting #98, Reno, Nevada, US, R3-174467, pp. 1-4, 3rd Generation Partnership Project, Valbonne, France (Nov. 27-Dec. 1, 2017).

* cited by examiner

KEY GENERATION METHOD AND RELATED APPARATUS

CROSS-REFERENCE TO RELATED APPLICATIONS

This application is a continuation of International Application No. PCT/CN2019/079331, filed on Mar. 22, 2019, which claims priority to Chinese Patent Application No. 201810254839.6, filed on Mar. 26, 2018. The disclosures of the aforementioned applications are hereby incorporated by reference in their entireties.

TECHNICAL FIELD

Embodiments of this application relate to the field of communications technologies, and in particular, to a key generation method and a related apparatus.

BACKGROUND

FIG. 1 is a schematic diagram of a key architecture in long term evolution (LTE). In LTE, a non-access stratum (NAS) key and a master key (KeNB) of an evolved NodeB (eNB) may be derived based on $K_{ASME}$ generated in an authentication and key agreement (AKA) process. The NAS key is used between a terminal and a mobility management entity (MME), and includes a NAS encryption key (which may be represented as $K_{NASenc}$) and a NAS integrity protection key (which may be represented as $K_{NASint}$). KeNB is used to calculate an access stratum (AS) key. The AS key is used between the terminal and the evolved NodeB (eNodeB or eNB), and includes a radio resource control (RRC) encryption key (which may be represented as $K_{RRCenc}$), an RRC integrity protection key (which may be represented as $K_{RRCint}$), and a user plane integrity protection key ($K_{UPenc}$). $K_{RRCenc}$ is used to perform encryption protection on an RRC message, $K_{RRCint}$ is used to perform integrity protection on the RRC message, and $K_{UPenc}$ is used to perform encryption protection on air interface user data.

However, in a future network, a base station may be divided into a centralized unit (CU) and a distributed unit (DU). The centralized unit may be further divided into a CU control plane (CU-CP) entity and a CU user plane (CU-UP) entity. One base station may include one CU-CP entity, a plurality of CU-UP entities, and a plurality of DUs. In this scenario, if the key architecture in LTE is still used, different CU-UP entities of a same base station use a same key, and there is a security risk.

SUMMARY

Embodiments of this application provide a key generation method and a related apparatus, to implement key isolation between different CU-UP entities.

According to a first aspect, an embodiment of this application provides a key generation method, applied to a scenario in which a first base station includes a first centralized unit and the first centralized unit includes a control plane entity and a user plane entity. The method includes: obtaining, by the control plane entity of the first centralized unit, a root key; generating, by the control plane entity of the first centralized unit, a first user plane security key based on the root key, where the first user plane security key is a user plane security key used between the user plane entity of the first centralized unit and a terminal, and the first user plane security key includes at least one of a first user plane encryption key and a first user plane integrity key; and sending, by the control plane entity of the first centralized unit, the first user plane security key to the user plane entity of the first centralized unit.

According to a second aspect, an embodiment of this application provides another key generation method, applied to a scenario in which a first base station includes a first centralized unit and the first centralized unit includes a control plane entity and a user plane entity. The method includes: receiving, by the user plane entity of the first centralized unit, a first user plane security key from the control plane entity of the first centralized unit, where the first user plane security key is a user plane security key used between the user plane entity of the first centralized unit and a terminal, and the first user plane security key includes at least one of a first user plane encryption key and a first user plane integrity key.

According to the solutions in the foregoing two aspects, when the base station is divided into a centralized unit and a distributed unit, and the centralized unit is divided into a control plane entity and a user plane entity, the control plane entity may generate different security keys for different user plane entities, to implement key isolation between the user plane entities.

The methods provided in the foregoing two aspects may be further implemented according to the following possible designs.

In a possible design, the first base station further includes a first distributed unit, and the control plane entity of the first centralized unit may generate the first user plane security key in the following manner: The control plane entity of the first centralized unit generates the first user plane security key based on the root key and at least one of a first security algorithm, an identifier of the user plane entity of the first centralized unit, an identifier of the first distributed unit, bearer information, session information, and tunnel endpoint identifier (TEID) information.

The first security algorithm is a security algorithm used between the user plane entity of the first centralized unit and the terminal. In view of the first security algorithm, there may be the following cases: Case 1: The first security algorithm is a security algorithm dedicated to a user plane security algorithm between a first CU-UP and the terminal. In this case, the user plane security algorithm between the first CU-UP and the terminal is different from a control plane security algorithm between a first CU-CP and the terminal, and the first CU-UP and the first CU-CP may be respectively configured with algorithms of the first CU-UP and the first CU-CP. Case 2: A user plane security algorithm used between a first CU-UP and the terminal is the same as a control plane security algorithm used between a first CU-CP and the terminal, and both the algorithms are first security algorithms. In other words, the first security algorithm is used not only as the user plane security algorithm between the first CU-UP and the terminal, but also as the control plane security algorithm between the first CU-CP and the terminal.

For example, the control plane entity of the first centralized unit may select the first security algorithm based on an algorithm priority list of the user plane entity of the first centralized unit, and the algorithm priority list includes the first security algorithm.

In a possible implementation, the algorithm priority list is stored in the control plane entity of the first centralized unit. In this way, the control plane entity of the first centralized unit may directly obtain the algorithm priority list locally.

In another possible implementation, the algorithm priority list is stored in the user plane entity of the first centralized unit. The control plane entity of the first centralized unit may receive the algorithm priority list from the user plane entity of the first centralized unit. Further, before receiving the algorithm priority list, the control plane entity of the first centralized unit may further request the algorithm priority list from the user plane entity of the first centralized unit.

In a possible design, the control plane entity of the first centralized unit may further send, to the terminal, a parameter used to generate the first user plane security key, where the parameter includes at least one of the following: the first security algorithm, the identifier of the user plane entity of the first centralized unit, the identifier of the first distributed unit, the bearer information, the session information, and the TEID information.

For the root key in this aspect, in a possible design, the root key is a root key of the control plane entity of the first centralized unit, and the control plane entity of the first centralized unit may obtain the root key in the following manner: The control plane entity of the first centralized unit receives the root key of the control plane entity that is of the first centralized unit and that is from a control plane entity of a second centralized unit. Alternatively, the control plane entity of the first centralized unit receives a root key of the first base station from a control plane entity of a second centralized unit, and generates the root key of the control plane entity of the first centralized unit based on the root key of the first base station. The second centralized unit is a centralized unit included in a second base station.

In another possible design, the root key is a root key of the first base station, and the control plane entity of the first centralized unit may obtain the root key in the following manner: The control plane entity of the first centralized unit receives the root key of the first base station from a control plane entity of a second centralized unit. The second centralized unit is a centralized unit included in a second base station.

According to a third aspect, an embodiment of this application provides still another key generation method, applied to a scenario in which a first base station includes a first centralized unit and the first centralized unit includes a control plane entity and a user plane entity. The method includes: obtaining, by the user plane entity of the first centralized unit, a root key; and generating, by the user plane entity of the first centralized unit, a first user plane security key based on the root key, where the first user plane security key is a user plane security key used between the user plane entity of the first centralized unit and a terminal, and the first user plane security key includes at least one of a first user plane encryption key and a first user plane integrity key.

For example, the user plane entity of the first centralized unit may further send the first user plane security key to the control plane entity of the first centralized unit.

According to a fourth aspect, an embodiment of this application provides yet another key generation method, applied to a scenario in which a first base station includes a first centralized unit and the first centralized unit includes a control plane entity and a user plane entity. The method includes: sending, by the control plane entity of the first centralized unit, a root key of the control plane entity of the first centralized unit or a root key of the first base station to the user plane entity of the first centralized unit; and receiving, by the control plane entity of the first centralized unit, a first user plane security key from the user plane entity of the first centralized unit, where the first user plane security key is a user plane security key used between the user plane entity of the first centralized unit and a terminal, and the first user plane security key is generated based on the root key.

According to the solutions in the foregoing two aspects, when the base station is divided into a centralized unit and a distributed unit, and the centralized unit is divided into a control plane entity and a user plane entity, the user plane entity may generate security keys of the user plane entity for different user plane entities, to implement key isolation between the user plane entities.

Further, when the control plane entity of the centralized unit interacts with the distributed unit, if the first user plane security key between the user plane entity of the centralized unit and the terminal needs to be used, the control plane entity of the centralized unit may obtain the first user plane security key according to the solution in this embodiment of this application.

The methods provided in the foregoing two aspects may be further implemented according to the following possible designs:

In a possible design, the first base station further includes a first distributed unit, and the user plane entity of the first centralized unit may generate the first user plane security key in the following manner: The control plane entity of the first centralized unit generates the first user plane security key based on the root key and at least one of a first security algorithm, an identifier of the user plane entity of the first centralized unit, an identifier of the first distributed unit, bearer information, session information, and tunnel endpoint identifier TEID information.

For descriptions of the first security algorithm, refer to the foregoing detailed descriptions. Details are not described herein again.

For example, the user plane entity of the first centralized unit may select the first security algorithm based on an algorithm priority list of the user plane entity of the first centralized unit, and the algorithm priority list includes the first security algorithm.

In a possible implementation, the algorithm priority list is stored in the user plane entity of the first centralized unit. In this way, the user plane entity of the first centralized unit may directly obtain the algorithm priority list locally.

In another possible implementation, the algorithm priority list is stored in the control plane entity of the first centralized unit. The user plane entity of the first centralized unit may receive the algorithm priority list from the control plane entity of the first centralized unit. Further, before receiving the algorithm priority list, the user plane entity of the first centralized unit may further request the algorithm priority list from the control plane entity of the first centralized unit.

In a possible design, the control plane entity of the first centralized unit may further send, to the terminal, a parameter used to generate the first user plane security key, where the parameter includes at least one of the following: the first security algorithm, the identifier of the user plane entity of the first centralized unit, the identifier of the first distributed unit, the bearer information, the session information, and the TEID information.

For the root key in this aspect, in a possible design, the root key is a root key of the control plane entity of the first centralized unit, and the user plane entity of the first centralized unit may obtain the root key in the following manner: The user plane entity of the first centralized unit receives the root key of the control plane entity of the first centralized unit from the control plane entity of the first centralized unit. Alternatively, the user plane entity of the first centralized unit receives a root key of the first base station from the control plane entity of the first centralized unit, and generates the root key of the control plane entity of the first centralized unit based on the root key of the first base station.

In another possible design, the root key is a root key of the first base station, and the user plane entity of the first centralized unit may obtain the root key in the following manner: The user plane entity of the first base station receives the root key of the first base station from the control plane entity of the first centralized unit.

According to a fifth aspect, an embodiment of this application provides yet another key generation method. The method includes: receiving, by a terminal from a control plane entity of a first centralized unit, a parameter used to generate a first user plane security key, where the parameter includes at least one of the following: a first security algorithm, an identifier of a user plane entity of the first centralized unit, an identifier of a first distributed unit, bearer information, session information, and tunnel endpoint identifier TEID information; and generating, by the terminal, the first user plane security key based on a root key and the parameter, where the first user plane security key is a user plane security key used between the user plane entity of the first centralized unit and the terminal, where the first centralized unit is a centralized unit included in a first base station, and the first centralized unit includes the control plane entity and the user plane entity.

For descriptions of the first security algorithm, refer to the foregoing detailed descriptions. Details are not described herein again.

According to a sixth aspect, an embodiment of this application provides a security context obtaining method. The method includes: receiving, by a unified data storage network element, a security context from a control plane entity of a centralized unit, where the security context includes a user plane security context and a control plane security context; storing, by the unified data storage network element, the security context; and sending, by the unified data storage network element, the security context to a user plane entity of the centralized unit.

According to the solution in this aspect, this embodiment of this application can provide the unified data storage network element, and the unified data storage network element may store the security context received from the control plane entity of the centralized unit, and provide the security context to the user plane entity of the centralized unit, to facilitate unified management and transfer of the security context.

In a possible design, the unified data storage network element may send the security context to the user plane entity of the centralized unit based on credential information, and the credential information is a credential used by the user plane entity of the centralized unit to obtain the security context from the unified data storage network element. For example, the credential information may be a token.

For example, the foregoing credential information may be allocated by the control plane entity of the centralized unit. Alternatively, the credential information may be generated by the unified data storage network element.

According to a seventh aspect, an embodiment of this application provides an apparatus. The apparatus has a function of implementing a behavior of the control plane entity of the first centralized unit in the foregoing method designs. The function may be implemented by hardware, or may be implemented by hardware executing corresponding software. The hardware or the software includes one or more modules corresponding to the foregoing function. For example, the apparatus may be a control plane entity of a centralized unit, or may be a chip in a control plane entity of a centralized unit.

In a possible design, the apparatus is the control plane entity of the centralized unit, the control plane entity of the centralized unit includes a processor, and the processor is configured to support the control plane entity of the centralized unit in performing a corresponding function in the foregoing methods. Further, the control plane entity of the centralized unit may further include a communications interface. The communications interface is configured to support communication between the control plane entity of the centralized unit and a user plane entity of the centralized unit or communication between the control plane entity of the centralized unit and another network element. Further, the control plane entity of the centralized unit may further include a memory. The memory is configured to couple to the processor, and the memory stores a program instruction and data that are necessary for the control plane entity of the centralized unit.

According to an eighth aspect, an embodiment of this application provides an apparatus. The apparatus has a function of implementing a behavior of the user plane entity of the first centralized unit in the foregoing method designs. The function may be implemented by hardware, or may be implemented by hardware executing corresponding software. The hardware or the software includes one or more modules corresponding to the foregoing function. For example, the apparatus may be a user plane entity of a centralized unit, or may be a chip in a user plane entity of a centralized unit.

In a possible design, the apparatus is the user plane entity of the centralized unit, the user plane entity of the centralized unit includes a processor, and the processor is configured to support the user plane entity of the centralized unit in performing a corresponding function in the foregoing methods. Further, the user plane entity of the centralized unit may further include a communications interface. The communications interface is configured to support communication between the user plane entity of the centralized unit and a control plane entity of the centralized unit or communication between the user plane entity of the centralized unit and another network element. Further, the user plane entity of the centralized unit may further include a memory. The memory is configured to couple to the processor, and the memory stores a program instruction and data that are necessary for the user plane entity of the centralized unit.

According to a ninth aspect, an embodiment of this application provides an apparatus. The apparatus has a function of implementing a behavior of the terminal in the foregoing method designs. The function may be implemented by hardware, or may be implemented by hardware executing corresponding software. The hardware or the software includes one or more modules corresponding to the foregoing function. For example, the apparatus may be a terminal, or may be a chip in a terminal.

In a possible design, the apparatus is the terminal, the terminal includes a processor, and the processor is configured to support the terminal in performing a corresponding function in the foregoing methods. Further, the terminal may further include a transceiver. The transceiver is configured to support communication between the terminal and a control plane entity of a centralized unit or communication between the terminal and another network element. Further, the terminal may further include a memory. The memory is configured to couple to the processor, and the memory stores a program instruction and data that are necessary for the terminal.

According to a tenth aspect, an embodiment of this application provides an apparatus. The apparatus has a function of implementing a behavior of the unified data storage network element in the foregoing method designs. The function may be implemented by hardware, or may be implemented by hardware executing corresponding software. The hardware or the software includes one or more modules corresponding to the foregoing function. For example, the apparatus may be a unified data storage network element, or may be a chip in a unified data storage network element.

In a possible design, the apparatus is the unified data storage network element, the unified data storage network element includes a processor, and the processor is configured to support the unified data storage network element in performing a corresponding function in the foregoing methods. Further, the unified data storage network element may further include a transceiver. The transceiver is configured to support communication between the unified data storage network element and a control plane entity of a centralized unit, communication between the unified data storage network element and a user plane entity of the centralized unit, or communication between the unified data storage network element and another network element. Further, the unified data storage network element may further include a memory. The memory is configured to couple to the processor, and the memory stores a program instruction and data that are necessary for the unified data storage network element.

According to an eleventh aspect, an embodiment of this application provides a base station. The base station includes the control plane entity of the centralized unit and the user plane entity of the centralized unit in the foregoing aspects.

According to a twelfth aspect, an embodiment of this application provides a communications system. The system includes the control plane entity of the centralized unit and the user plane entity of the centralized unit in the foregoing aspects. Alternatively, the system includes the control plane entity of the centralized unit, the user plane entity of the centralized unit, and the terminal in the foregoing aspects.

According to a thirteenth aspect, an embodiment of this application provides a computer storage medium, configured to store a computer software instruction to be used by the control plane entity of the foregoing centralized unit, and the computer software instruction includes a program designed for performing the first aspect or the fourth aspect.

According to a fourteenth aspect, an embodiment of this application provides a computer storage medium, configured to store a computer software instruction to be used by the user plane entity of the foregoing centralized unit, and the computer software instruction includes a program designed for performing the second aspect or the third aspect.

According to a fifteenth aspect, an embodiment of this application provides a computer storage medium, configured to store a computer software instruction to be used by the foregoing terminal, and the computer storage medium includes a program designed for performing the fifth aspect.

According to a sixteenth aspect, an embodiment of this application provides a computer storage medium, configured to store a computer software instruction to be used by the foregoing unified data storage network element, and the computer storage medium includes a program designed for performing the sixth aspect.

According to a seventeenth aspect, an embodiment of this application provides a chip system, applied to a control plane entity of a centralized unit, and the chip system includes at least one processor, a memory, and an interface circuit. The memory, the transceiver, and the at least one processor are interconnected through a line. The at least one memory stores an instruction, and the instruction is executed by the processor to perform an operation of the control plane entity of the first centralized unit in the foregoing methods.

According to an eighteenth aspect, an embodiment of this application provides a chip system, applied to a user plane entity of a centralized unit, and the chip system includes at least one processor, a memory, and an interface circuit. The memory, the transceiver, and the at least one processor are interconnected through a line. The at least one memory stores an instruction, and the instruction is executed by the processor to perform an operation of the user plane entity of the first centralized unit in the foregoing methods.

According to a nineteenth aspect, an embodiment of this application provides a chip system, applied to a terminal, and the chip system includes at least one processor, a memory, and an interface circuit. The memory, the transceiver, and the at least one processor are interconnected through a line. The at least one memory stores an instruction, and the instruction is executed by the processor to perform an operation of the terminal in the foregoing methods.

According to a twentieth aspect, an embodiment of this application provides a chip system, applied to a unified data storage network element, and the chip system includes at least one processor, a memory, and an interface circuit. The memory, the transceiver, and the at least one processor are interconnected through a line. The at least one memory stores an instruction, and the instruction is executed by the processor to perform an operation of the unified data storage network element in the foregoing methods.

Compared with the prior art, when the base station is divided into the centralized unit and the distributed unit, and the centralized unit is divided into the control plane entity and the user plane entity, according to the solutions in the embodiments of this application, the control plane entity may generate different security keys or the user plane entity may generate a security key of the user plane entity for different user plane entities, to implement key isolation between user plane entities.

DESCRIPTION OF EMBODIMENTS

The following describes the technical solutions in the embodiments of this application with reference to the accompanying drawings in the embodiments of this application.

A network architecture and an application scenario described in the embodiments of this application are intended to describe the technical solutions in the embodiments of this application more clearly, and do not constitute a limitation to the technical solutions provided in the embodiments of this application. A person of ordinary skill in the art may know that: With evolution of the network architecture and emergence of new application scenarios, the technical solutions provided in the embodiments of this application are also applicable to similar technical problems.

The following first describes, with reference to FIG. 2A to FIG. 2D, a network architecture to which the embodiments of this application are applicable.

Figure 1:
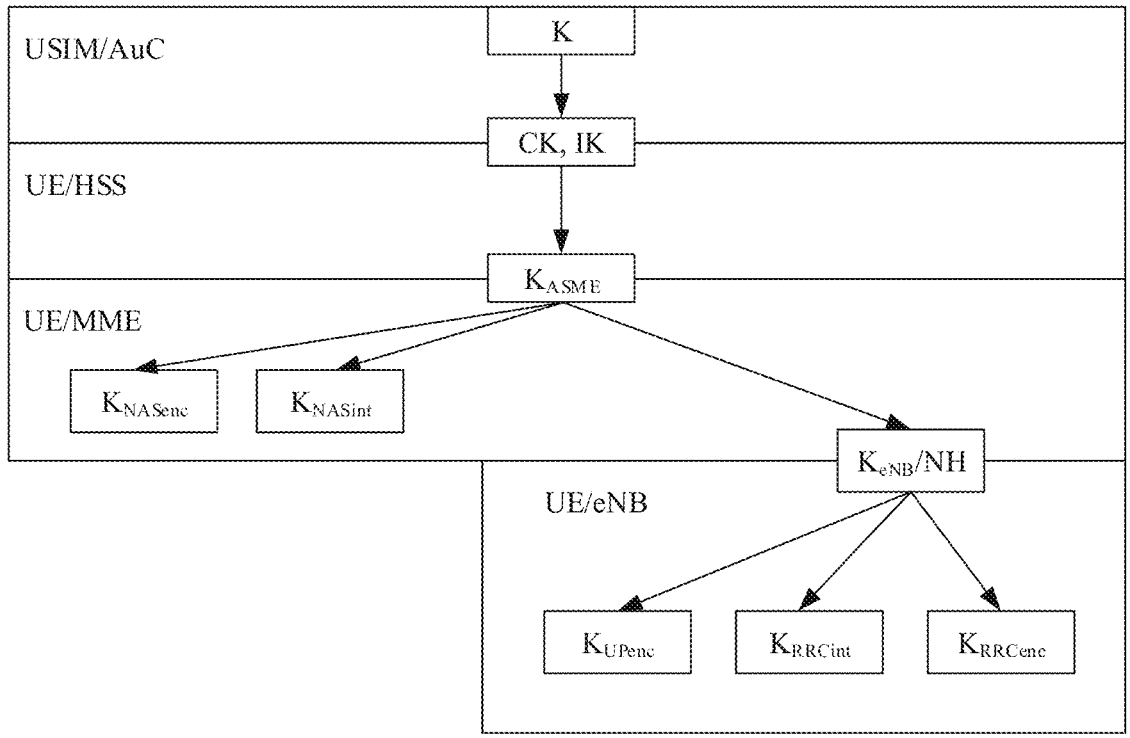
FIG. 1 is a schematic diagram of a key architecture in LTE.
Figure 2A:
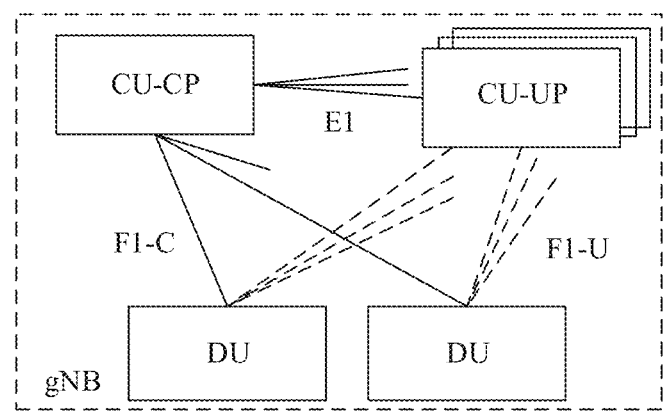
FIG. 2A is a schematic diagram of a possible network architecture according to an embodiment of this application.

FIG. 2A is a schematic diagram of a possible network architecture according to this application. As shown in FIG. 2A, a next generation NodeB (gNB) mainly includes a CU and a DU, and the CU is further divided into a CU-CP and a CU-UP. The following describes these function units or entities.

The DU covers some functions of a physical layer and of a layer 2 (media access control (MAC)/radio link control (RLC) of baseband processing. In consideration of a transmission resource of a remote radio unit (RRU) and the DU, some physical layer functions of the DU may be implemented on the RRU, with miniaturization of the RRU, and even more radically, the DU may be combined with the RRU. Deployment of the DU depends on an actual network environment. For example, in a core urban area, and an area with relatively high traffic density, a relatively small inter-site distance, or limited equipment room resources, such as a college/university or a large-scale performance venue, the DU can be deployed in a centralized manner. However, in an area with relatively sparse traffic or a relatively large inter-site distance, such as a suburban county or a mountainous area, the DU can be deployed in a distributed manner.

The CU covers a higher layer protocol stack of a radio access network and some functions of a core network, for example, functions of a radio resource control (RRC) layer and a packet data convergence layer protocol (PDCP) layer, and even can support some core network functions in implementing on an access network. A network in which some core network functions implement on the access network is termed as an edge computing network. In this way, a higher network latency requirement of a future communications network for an emerging service such as a video, online shopping, or virtual/augmented reality can be met.

The CU-CP is a control plane function entity of a centralized unit, covering functions of an RRC layer and a PDCP layer, mainly performing resource management and scheduling on the DU and the CU-UP, and managing and forwarding control signaling.

The CU-UP is a user plane function entity of a centralized unit, mainly covering a PDCP layer currently, and mainly transmitting user plane data (user plane traffic), and transmitting data when a session arrives.

Such division of the gNB as an access basic processing unit has many advantages. For example, in a 5G network, especially with a support of a cloudification technology, through decoupling of a user plane and a control plane, simultaneous connections of networks of different standards can be implemented. Control plane signaling related to a service session is carried on an existing network that is a conventional network that already implements continuous coverage. If there is 5G network coverage, data plane scheduling is carried on the 5G network. If there is no 5G network coverage, the data plane scheduling is carried on the conventional network. In this way, the 5G network can be deployed as required without considering continuous coverage.

It can be learned from FIG. 2A that connection relationships between the function units are as follows:

(1) one gNB may include one CU-CP, one or more DUs, and one or more CU-UPs;

(2) the CU-CP and the DU are connected through an F1-C interface;

(3) the CU-UP and the DU are connected through an F1-U interface;

(4) the CU-UP and the CU-CP are connected through an E1 interface;

(5) one DU can be connected to only one CU-UP;

(6) generally, one CU-UP can be connected to only one CU-CP, where in a special case, the CU-UP may be connected to a plurality of CU-CPs, for example, for more flexible and resilient network deployment, the CU-CP may need to be connected to two or more CU-CPs, for example, when load of one CU-CP is excessively heavy, the CU-UP may need to be allocated or routed to another CU-CP;

(7) a plurality of CU-UPs may be connected to only one DU; and (8) a plurality of DUs may be connected to only one CU-UP.

Figure 2B:
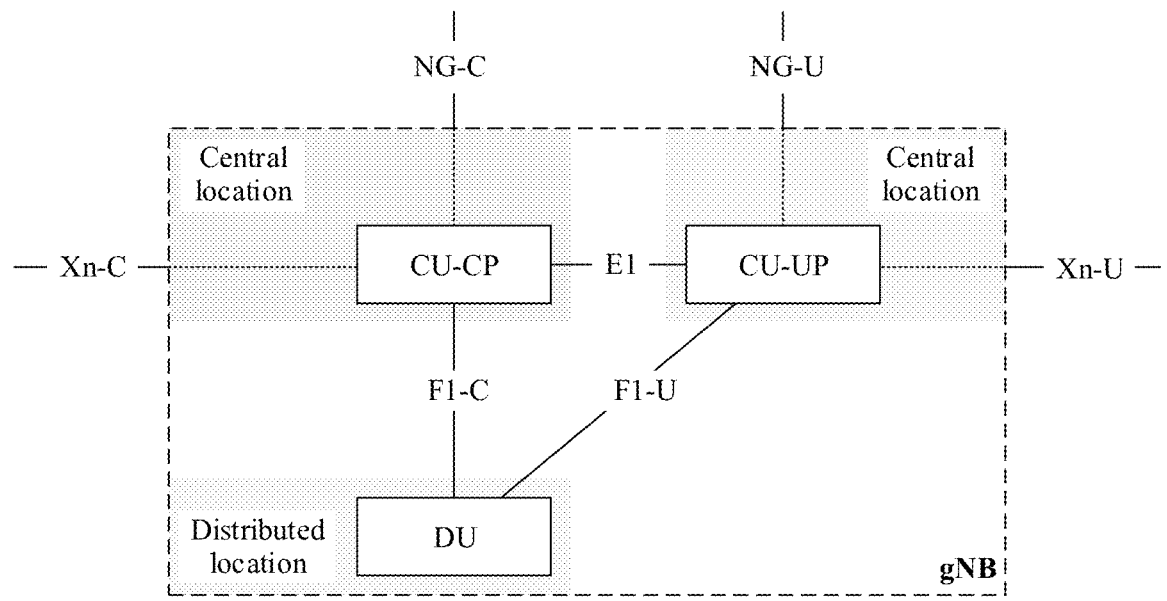
FIG. 2B is a schematic diagram of a first deployment scenario of a network architecture according to an embodiment of this application.
Figure 2C:
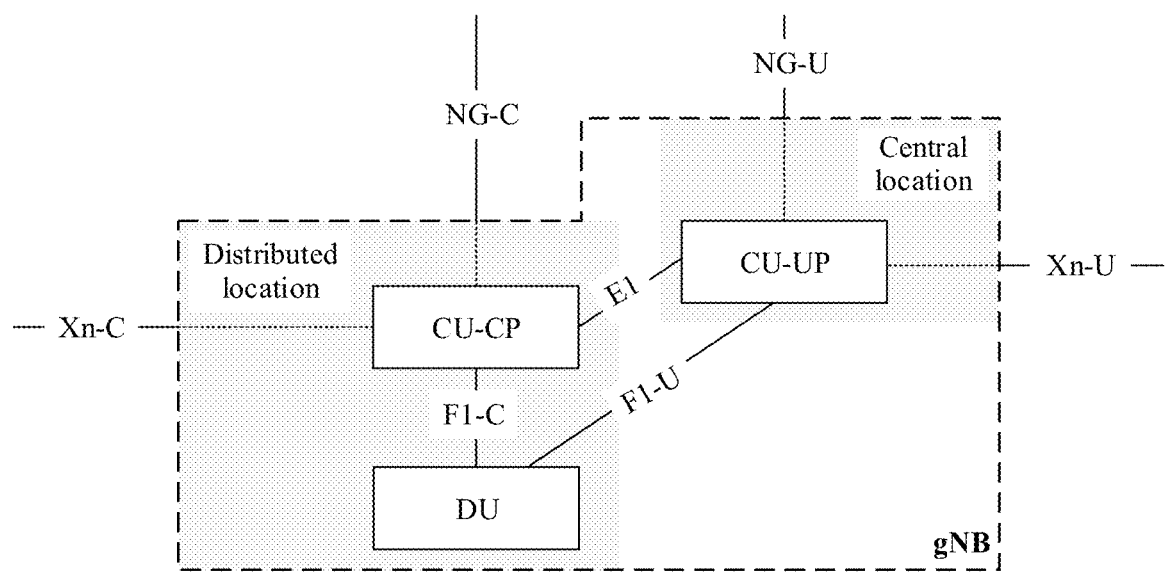
FIG. 2C is a schematic diagram of a second deployment scenario of a network architecture according to an embodiment of this application.
Figure 2D:
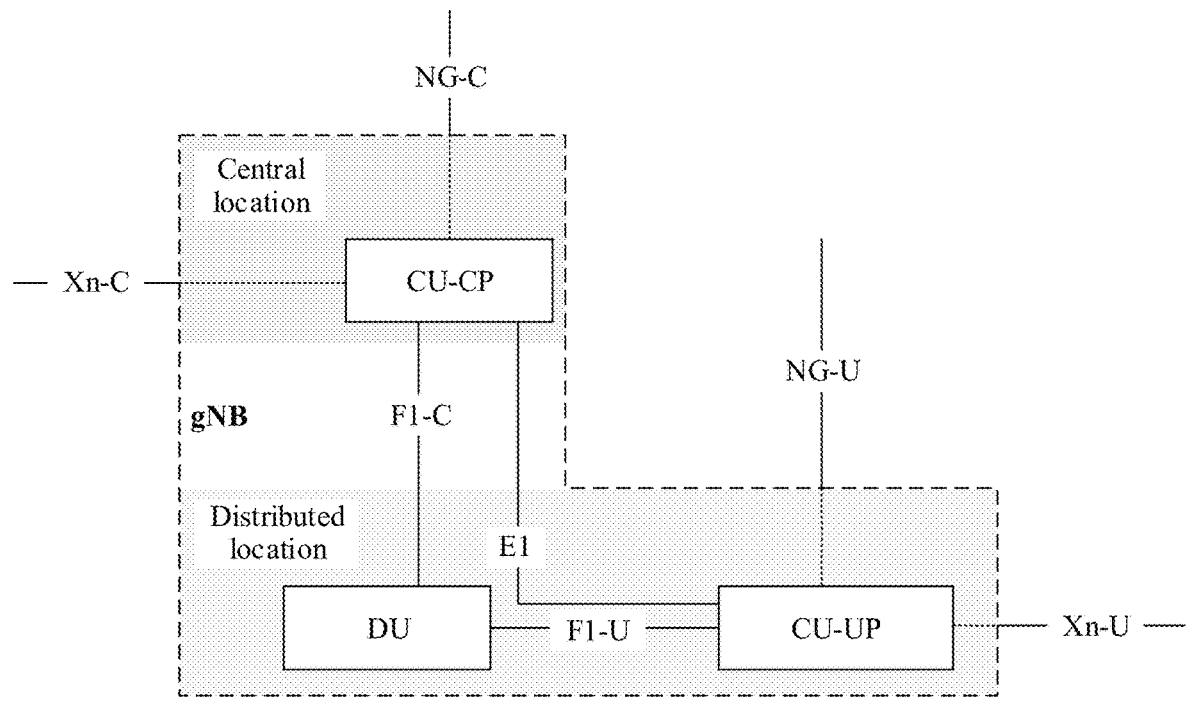
FIG. 2D is a schematic diagram of a third deployment scenario of a network architecture according to an embodiment of this application.

Based on the network architecture shown in FIG. 2A, in an actual application, there are three main deployment scenarios, which are respectively shown in FIG. 2B, FIG. 2C, and FIG. 2D. In FIG. 2B, FIG. 2C, and FIG. 2D, an NG-C interface is an interface (for example, an N2 interface in a 5G architecture) between a gNB and an AMF, an NG-U interface is an interface (for example, an N3 interface in the 5G architecture) between the gNB and a UPF, an Xn-C interface is an interface between the CU-CP and another CU-CP, and an Xn-U interface is an interface between the CU-UP and another CU-UP.

FIG. 2B is a schematic diagram of a first deployment scenario. As shown in FIG. 2B, in the first deployment scenario, a CU-CP and a CU-UP are located at central locations, for example, may be deployed in an equipment room, and this facilitates a cloud technology in implementing the CU-CP and the CU-UP through virtualization. The CU-CP is located at the central location and can better provide load balancing and resource coordination for a DU. The DU is located at a distributed location.

FIG. 2C is a schematic diagram of a second deployment scenario. As shown in FIG. 2C, in the second deployment scenario, a CU-CP and a DU are located at distributed locations and are deployed outdoors, and one CU-CP manages one DU. This is applied to a scenario in which there are a large quantity of signaling operations. A CU-CP manages a single DU, for example, in a scenario of critical communication, a key needs to be changed periodically. However, a UP can be implemented through the cloud technology. A latency between the CU-CP and the CU-UP is increased. This deployment manner is applicable to a scenario in which there are a relatively large quantity of link reestablishments, handovers, and state transitions, and particularly, a mobility scenario such as an internet of vehicles. The CU-UP is located at a central location.

FIG. 2D is a schematic diagram of a third deployment scenario. As shown in FIG. 2D, in the third deployment scenario, a CU-CP is located at a central location. A CU-UP and a DU are located at distributed locations. This scenario may be, for example, an ultra-reliable and low-latency communication (URLLC) scenario in which user plane data is transmitted after one central interaction. Alternatively, cloud implementation may be performed on a user plane side, to implement a low latency of data transmission, for example, data transmission in critical machine type communication (critical MTC).

The following further describes the embodiments of this application in detail based on the foregoing common parts in this application.

In the network architectures shown in FIG. 2A to FIG. 2D, if a key architecture in LTE is still used, different CU-UPs of a same base station use a same key, and there is a security risk.

In view of this, the embodiments of this application provide two key generation methods, and a control plane entity of a first centralized unit, a user plane entity of the first centralized unit, and a terminal that are based on the two methods. The following separately describes the two key generation methods:

The first key generation method is applied to a scenario in which a first base station includes a first centralized unit and the first centralized unit includes a control plane entity and a user plane entity. The method includes: obtaining, by the control plane entity of the first centralized unit, a root key; generating, by the control plane entity of the first centralized unit, a first user plane security key based on the root key, where the first user plane security key is a user plane security key used between the user plane entity of the first centralized unit and a terminal, and the first user plane security key includes at least one of a first user plane encryption key and a first user plane integrity key; sending, by the control plane entity of the first centralized unit, the first user plane security key to the user plane entity of the first centralized unit; and correspondingly, receiving, by the user plane entity of the first centralized unit, the first user plane security key from the control plane entity of the first centralized unit.

When a base station is divided into a centralized unit and a distributed unit, and the centralized unit is divided into a control plane entity and a user plane entity, according to the foregoing method, the control plane entity may generate different security keys for different user plane entities, to implement key isolation between the user plane entities.

The second key generation method is applied to a scenario in which a first base station includes a first centralized unit and the first centralized unit includes a control plane entity and a user plane entity. The method includes: obtaining, by the user plane entity of the first centralized unit, a root key; and generating, by the user plane entity of the first centralized unit, a first user plane security key based on the root key, where the first user plane security key is a user plane security key used between the user plane entity of the first centralized unit and a terminal, and the first user plane security key includes at least one of a first user plane encryption key and a first user plane integrity key.

Further, the user plane entity of the first centralized unit may further send the first user plane security key to the control plane entity of the first centralized unit. Correspondingly, the control plane entity of the first centralized unit may receive the first user plane security key from the user plane entity of the first centralized unit.

When a base station is divided into a centralized unit and a distributed unit, and the centralized unit is divided into a control plane entity and a user plane entity, according to the foregoing method, the user plane entity may generate a security key of the user plane entity for different user plane entities, to implement key isolation.

In addition to the foregoing two key generation methods, the embodiments of this application further provide a key transmission method for the following consideration.

In LTE, when an initial AS security context needs to be established between a terminal and an eNB, a KeNB and a next hop (NH) parameter are derived between the terminal and an MME. KeNB and the NH parameter are closely related to a next hop chaining counter (NCC). If the terminal is handed over from another eNB to the eNB, the NCC related to KeNB correspondingly derives a value of the NH parameter of KeNB. If the terminal initially accesses the eNB, a value of the NCC related to KeNB is 0.

In LTE, if the terminal needs to be handed over from a source eNB to a target eNB, the source eNB derives one KeNB* based on the NH parameter or KeNB between a source base station and the terminal. Then, the target eNB uses KeNB* as KeNB between the target eNB and the terminal. Correspondingly, the terminal also derives same KeNB*, and uses KeNB* as KeNB between the terminal and the target eNB after the handover.

However, in a scenario in which the base station is divided into the CU and the DU, and the CU is further divided into the CU-CP and the CU-UP, if the terminal is handed over due to a reason such as movement, a corresponding key transmission mechanism is currently unavailable.

Figure 2E:
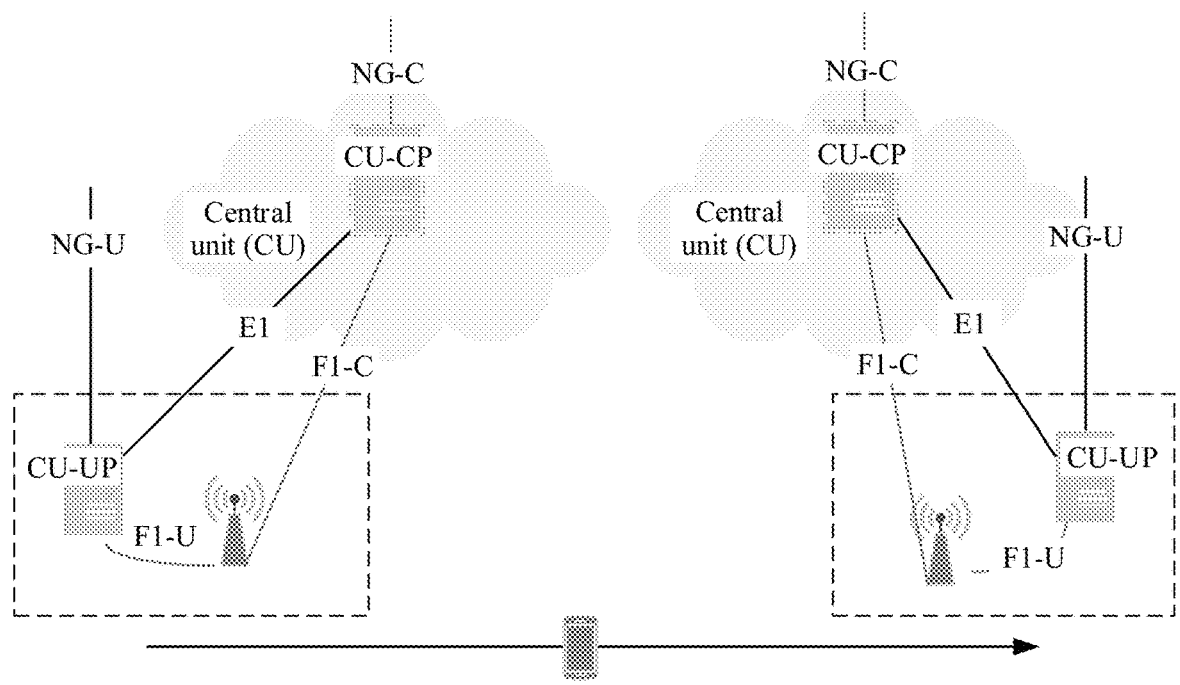
FIG. 2E is a schematic diagram of a first mobility scenario according to an embodiment of this application.
Figure 2F:
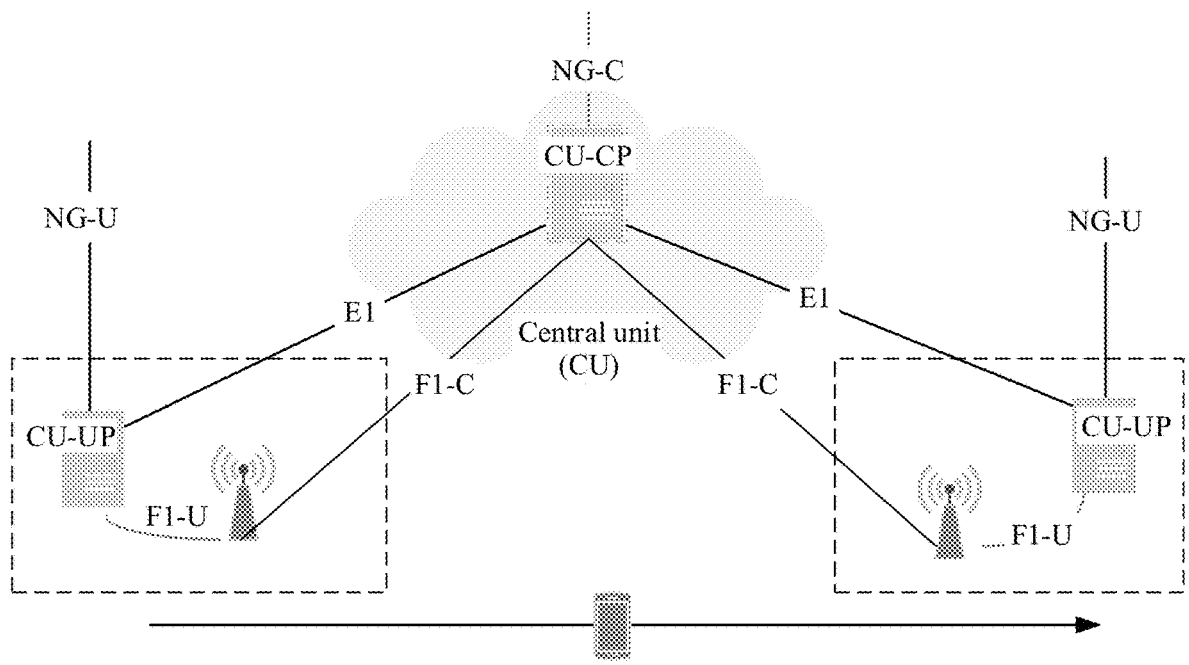
FIG. 2F is a schematic diagram of a second mobility scenario according to an embodiment of this application.

In the network architectures shown in FIG. 2A to FIG. 2D, if the terminal moves, there may be two mobility scenarios, as shown in FIG. 2E and FIG. 2F respectively.

As shown in FIG. 2E, in the first mobility scenario, the terminal moves across the CU-UP and the CU-CP.

As shown in FIG. 2F, in the second mobility scenario, the terminal moves across the CU-UP rather than the CU-CP.

In the first mobility scenario shown in FIG. 2E, the embodiments of this application provide a key transmission method, and a control plane entity of a first centralized unit and a control plane entity of a second centralized unit that are based on the method. The method includes: determining, by a control plane entity of a second centralized unit, to hand over a terminal from the control plane entity of the second centralized unit to a control plane entity of a first centralized unit; and sending, by the control plane entity of the second centralized unit, a root key of a first base station or a root key of the control plane entity of the first centralized unit to the control plane entity of the first centralized unit, where the second centralized unit is a centralized unit included in a second base station, and the first centralized unit is a centralized unit included in the first base station.

For example, in the method, if the control plane entity of the second centralized unit sends the root key of the control plane entity of the first centralized unit to the control plane entity of the first centralized unit, before this, the control plane entity of the second centralized unit may further generate the root key of the control plane entity of the first centralized unit based on the root key of the first base station.

In a possible implementation, the control plane entity of the second centralized unit may send the root key of the first base station or the root key of the control plane entity of the first centralized unit to the control plane entity of the first centralized unit through a handover request.

According to the foregoing method, when the control plane entity of the centralized unit is handed over, a source side may send the root key to a target side, thereby facilitating a subsequent key derivation process on the target side.

It needs to be noted that in the embodiments of this application, either of the foregoing two key generation methods and the foregoing key transmission method may be independently performed, or may be performed together. It may be understood that, when one of the two key generation methods and the foregoing key transmission method are performed, the key transmission method may be a manner in which a first CU-CP obtains the root key of the control plane entity of the first centralized unit or the root key of the first base station in the key generation method.

Figure 3A:
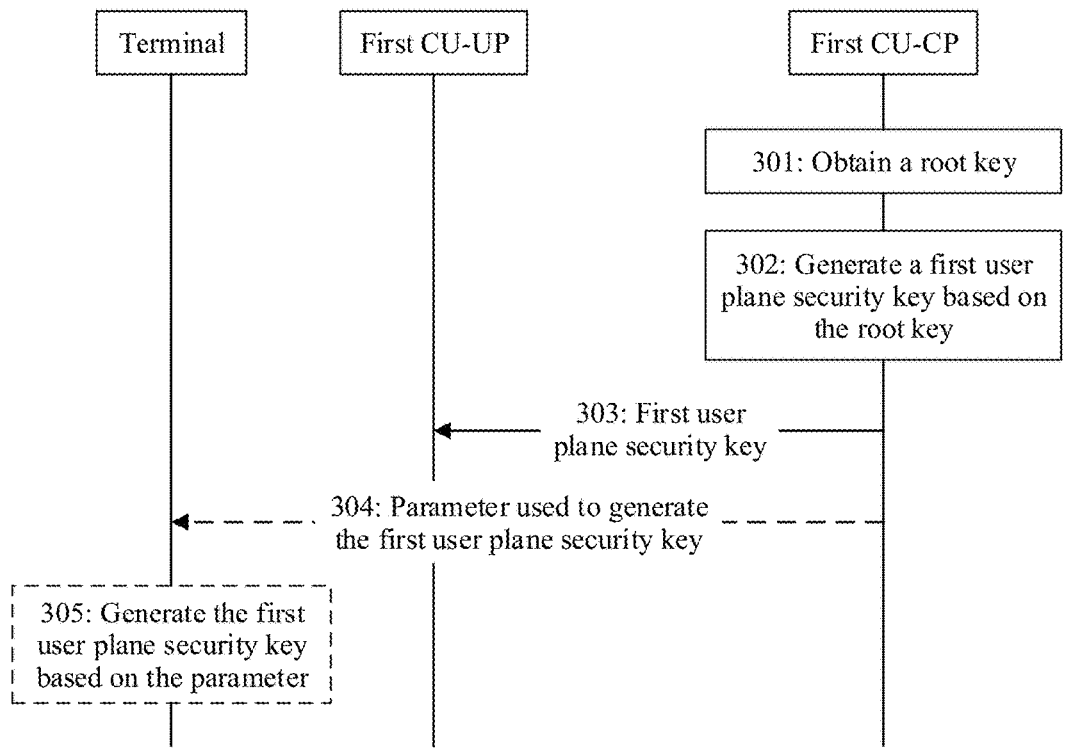
FIG. 3A is a schematic communication diagram of a first key generation method according to an embodiment of this application.
Figure 3B:
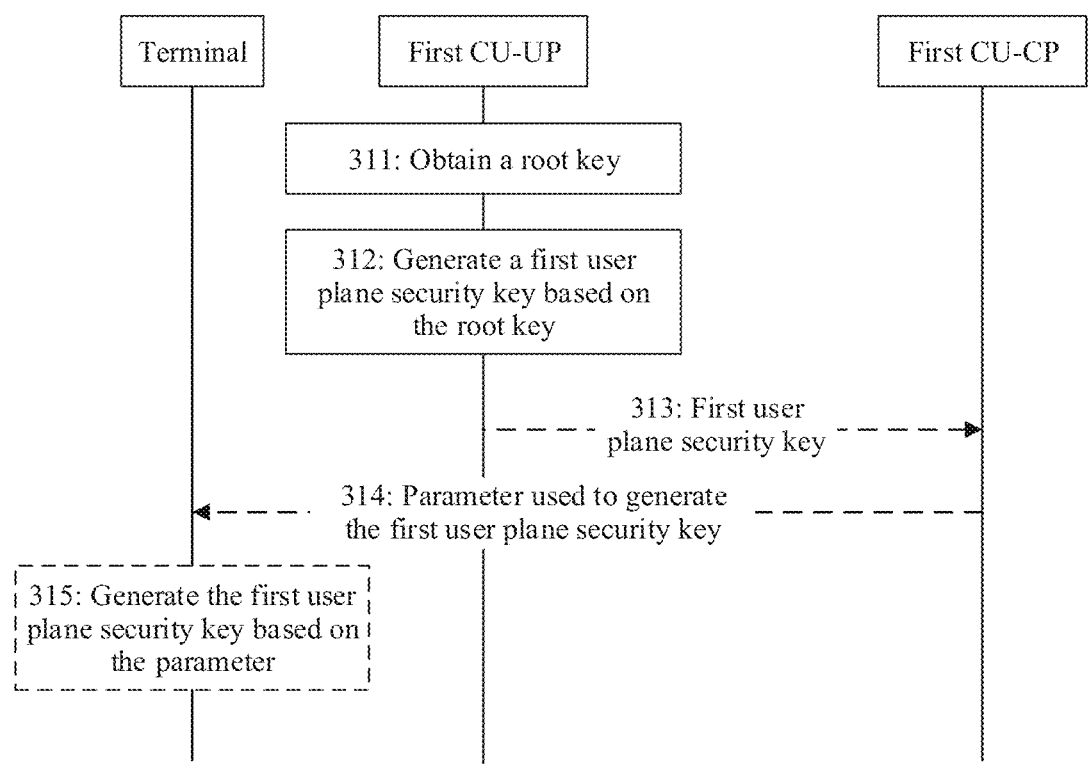
FIG. 3B is a schematic communication diagram of a second key generation method according to an embodiment of this application.

The following respectively describes the foregoing two key generation methods with reference to FIG. 3A and FIG. 3B.

FIG. 3A is a schematic communication diagram of a first key generation method according to an embodiment of this application. For ease of description, in FIG. 3A, a first centralized unit is described as a first CU, a control plane entity of the first centralized unit is described as a first CU-CP, and a user plane entity of the first centralized unit is described as a first CU-UP. The method shown in FIG. 3A includes step 301 to step 303.

Step 301: The first CU-CP obtains a root key.

For example, the root key may be a root key of the first CU-CP, or the root key may be a root key of a first base station. Specifically, in a 5G system, the root key of the first CU-CP may be represented as first $K_{CU-CP}^*$; and the root key of the first base station may be represented as first $K_{gNB}^*$.

In a possible implementation, the root key is the root key of the first CU-CP, and the first CU-CP may obtain the root key of the first CU-CP in the following two manners: Manner 1: The first CU-CP receives the root key of the first CU-CP from a second CU-CP. Manner 2: The first CU-CP receives the root key of the first base station from a second CU-CP, and generates the root key of the first CU-CP based on the root key of the first base station.

In another possible implementation, the root key is the root key of the first base station, and the first CU-CP may obtain the root key of the first base station in the following manner: The first CU-CP receives the root key of the first base station from the second CU-CP.

The second CU-CP in the foregoing two possible implementations is used to indicate a control plane entity of a second centralized unit, and the second centralized unit is a centralized unit included in a second base station.

Step 302: The first CU-CP generates a first user plane security key based on the root key.

The first user plane security key is a user plane security key used between the first CU-UP and a terminal. Further, the first user plane security key may include at least one of a first user plane encryption key and a first user plane integrity key.

In a possible implementation, the first base station further includes a first distributed unit (which may be represented as a first DU). The first CU-CP may generate the first user plane security key in the following manner: The first CU-CP generates the first user plane security key based on the root key and at least one of a first security algorithm, an identifier of the first CU-UP, an identifier of the first DU, bearer information, session information, and tunnel endpoint identifier (TEID) information.

For example, the first CU-CP may generate the first user plane security key based on the root key and another key derivation parameter. The another key derivation parameter may include at least one of the following: an instance ID, a CU-UP ID, a CU ID, a gNB identifier, a CU-CP ID, a DU ID, a flow ID, bearer information, session information, a slice ID, a MAC layer identifier, an RRC signaling counter, a NAS count, and a fresh parameter. If the fresh parameter is used, the parameter needs to be finally sent to UE, and the fresh parameter may be a Count, a Nonce, a Random number, or the like. For descriptions of the content, refer to the following detailed descriptions in FIG. 4A and FIG. 4B. Details are not described herein.

The foregoing first security algorithm is a security algorithm used between the first CU-UP and the terminal. In view of the first security algorithm, there may be the following cases: Case 1: The first security algorithm is a security algorithm dedicated to a user plane security algorithm between the first CU-UP and the terminal. In this case, the user plane security algorithm between the first CU-UP and the terminal is different from a control plane security algorithm between the first CU-CP and the terminal, and the first CU-UP and the first CU-CP may be respectively configured with algorithms of the first CU-UP and the first CU-CP. Case 2: A user plane security algorithm used between the first CU-UP and the terminal is the same as a control plane security algorithm used between the first CU-CP and the terminal, and both the algorithms are first security algorithms. In other words, the first security algorithm is used not only as the user plane security algorithm between the first CU-UP and the terminal, but also as the control plane security algorithm between the first CU-CP and the terminal.

The identifier of the first CU-UP is information that uniquely identifies the first CU-UP, and may be represented as, for example, a first CU-UP ID (identity).

The identifier of the first DU is information that uniquely identifies the first DU, and may be represented as, for example, a first DU ID, a physical cell identifier (PCI), or a frequency.

The bearer information may include at least one of the following: a bearer ID, a bearer uplink direction indication, a bearer downlink direction indication, and a bearer quantity. Certainly, the bearer information may further include other bearer-related content. This is not limited in this embodiment of this application.

The session information may include at least one of the following: a session identifier (which may be represented as a session ID) and a service type of a session. Certainly, the session information may further include other session-related content. This is not limited in this embodiment of this application.

The TEID information is used to identify a tunnel for transmitting data, and may include, for example, at least one of the following: an uplink identifier of the tunnel for transmitting data and a downlink identifier of the tunnel for transmitting data.

Further, when generating the first user plane security key, the first CU-CP may refer to at least one of the following information in addition to the foregoing listed information: an identifier of the first base station, an identifier of the first CU-CP, and a random number. The identifier of the first base station is information that uniquely identifies the first base station, and may be represented as, for example, an ID of the first base station, a physical cell ID, or a frequency. The identifier of the first CU-CP is information that uniquely identifies the first CU-CP, and may be represented as, for example, a first CU-CP ID. The random number may be any one of the following: a nonce, a counter, a random number, or the like.

For the first security algorithm, before generating the first user plane security key, the first CU-CP may further select the first security algorithm based on an algorithm priority list of the first CU-UP. The algorithm priority list includes the first security algorithm. Further, the algorithm priority list may further include another security algorithm.

In an example, the algorithm priority list is stored in the first CU-CP. The first CU-CP may directly obtain the algorithm priority list locally to select the first security algorithm.

In another example, the algorithm priority list is stored in the first CU-UP. The first CU-CP may receive the algorithm priority list from the first CU-UP. Further, before receiving the algorithm priority list, the first CU-CP may further request the algorithm priority list from the first CU-UP.

Step 303: The first CU-CP sends the first user plane security key to the first CU-UP.

Optionally, in addition to step 301 to step 303, the method shown in FIG. 3A may further include step 304 and step 305.

Step 304: The first CU-CP sends, to the terminal, a parameter used to generate the first user plane security key.

Correspondingly, the terminal receives, from the first CU-CP, the parameter used to generate the first user plane security key.

The parameter may include at least one of the following: the first security algorithm, the identifier of the first CU-UP, the identifier of the first DU, the bearer information, the session information, and the tunnel endpoint identifier TEID information.

Step 305: The terminal generates the first user plane security key based on the foregoing parameter.

FIG. 3B is a schematic communication diagram of a second key generation method according to an embodiment of this application. It needs to be noted that in the method shown in FIG. 3B, for content that is the same as or similar to that in the method shown in FIG. 3A, refer to the detailed descriptions in FIG. 3A. Details are not described again subsequently. For ease of description, in FIG. 3B, a first centralized unit is described as a first CU, a control plane entity of the first centralized unit is described as a first CU-CP, and a user plane entity of the first centralized unit is described as a first CU-UP. The method shown in FIG. 3B includes step 311 and step 312.

Step 311: The first CU-UP obtains a root key.

For example, the root key may be a root key of the first CU-CP, or the root key may be a root key of a first base station. Specifically, in a 5G system, the root key of the first CU-CP may be represented as first $K_{CU\text{-}CP}^*$; and the root key of the first base station may be represented as first $K_{gNB}^*$.

In a possible implementation, the root key is the root key of the first CU-CP, and the first CU-UP may obtain the root key of the first CU-CP in the following two manners: Manner 1: The first CU-UP receives the root key of the first CU-CP from the first CU-CP. Manner 2: The first CU-UP receives the root key of the first base station from the first CU-CP, and generates the root key of the first CU-CP based on the root key of the first base station.

In another possible implementation, the root key is the root key of the first base station, and the first CU-UP may obtain the root key of the first base station in the following manner: The first CU-UP receives the root key of the first base station from the first CU-CP.

Step 312: The first CU-UP generates a first user plane security key based on the root key.

The first user plane security key is a user plane security key used between the first CU-UP and a terminal. Further, the first user plane security key may include at least one of a first user plane encryption key and a first user plane integrity key.

In a possible implementation, the first base station further includes a first distributed unit (which may be represented as a first DU). The first CU-UP may generate the first user plane security key in the following manner: The first CU-UP generates the first user plane security key based on the root key and at least one of a first security algorithm, an identifier of the first CU-UP, an identifier of the first DU, bearer information, session information, and TEID information.

Further, when generating the first user plane security key, the first CU-UP may refer to at least one of the following information in addition to the foregoing listed information: an identifier of the first base station, an identifier of the first CU-CP, a nonce, and a counter.

For example, the first CU-UP may generate the first user plane security key based on the root key and another key derivation parameter. The another key derivation parameter may include at least one of the following: an instance ID, a CU-UP ID, a CU ID, a gNB identifier, a CU-CP ID, a DU ID, a flow ID, bearer information, session information, a slice ID, a MAC layer identifier, an RRC signaling counter, a NAS count, and a fresh parameter. If the fresh parameter is used, the parameter needs to be finally sent to UE, and the fresh parameter may be a count, a nonce, a random number, or the like. For descriptions of the content, refer to the following detailed descriptions in FIG. 4A and FIG. 4B. Details are not described herein.

For descriptions of the first security algorithm, the identifier of the first CU-UP, the identifier of the first DU, the bearer information, the session information, the TEID information, the identifier of the first base station, the identifier of the first CU-CP, the nonce, and the counter, refer to the detailed descriptions in the method shown in FIG. 3A. Details are not described herein again.

For the first security algorithm, before generating the first user plane security key, the first CU-UP may further select the first security algorithm based on an algorithm priority list of the first CU-UP. The algorithm priority list includes the first security algorithm. Further, the algorithm priority list may further include another security algorithm.

In an example, the algorithm priority list is stored in the first CU-UP. The first CU-UP may directly obtain the algorithm priority list locally to select the first security algorithm.

In another example, the algorithm priority list is stored in the first CU-CP. The first CU-UP may receive the algorithm priority list from the first CU-CP. Further, before receiving the algorithm priority list, the first CU-UP may further request the algorithm priority list from the first CU-CP.

Further, the method shown in FIG. 3B may further include step 313.

Step 313: The first CU-UP sends the first user plane security key to the first CU-CP.

Optionally, in addition to step 311 to step 313, the method shown in FIG. 3B may further include step 314 and step 315. Step 314 is the same as step 304 in FIG. 3A, and step 315 is the same as step 305 in FIG. 3A. For details, refer to the detailed descriptions in FIG. 3A. Details are not described herein again.

The foregoing describes two key generation methods provided in the embodiments of this application with reference to FIG. 3A and FIG. 3B. It needs to be noted that both the two key generation methods may be applied to the network architectures shown in FIG. 2A to FIG. 2D, and the two mobility scenarios shown in FIG. 2E and FIG. 2F. In addition, it can be learned from the foregoing descriptions that a main difference between the two methods lies in that, in the first key generation method shown in FIG. 3A, the first CU-CP generates the first user plane security key, while in the second key generation method shown in FIG. 3B, the first CU-UP generates the first user plane security key.

The following further describes the solutions in the embodiments of this application with reference to FIG. 4A and FIG. 4B to FIG. 7A and FIG. 7B. In the methods shown in FIG. 4A and FIG. 4B to FIG. 7A and FIG. 7B, an example in which a first CU-CP is a control plane entity (represented as a T-CU-CP) of a target centralized unit, a second CU-CP is a control plane entity (represented as an S-CU-CP) of a source centralized unit, and a first CU-UP is a user plane entity (represented as a T-CU-UP) of the target centralized unit is used for description. In addition, an S-DU represents a source distributed unit, an S-CU-UP represents a user plane entity of the source centralized unit, a T-DU represents a target distributed unit, and an AMF represents an access and mobility management entity.

Figure 4A:
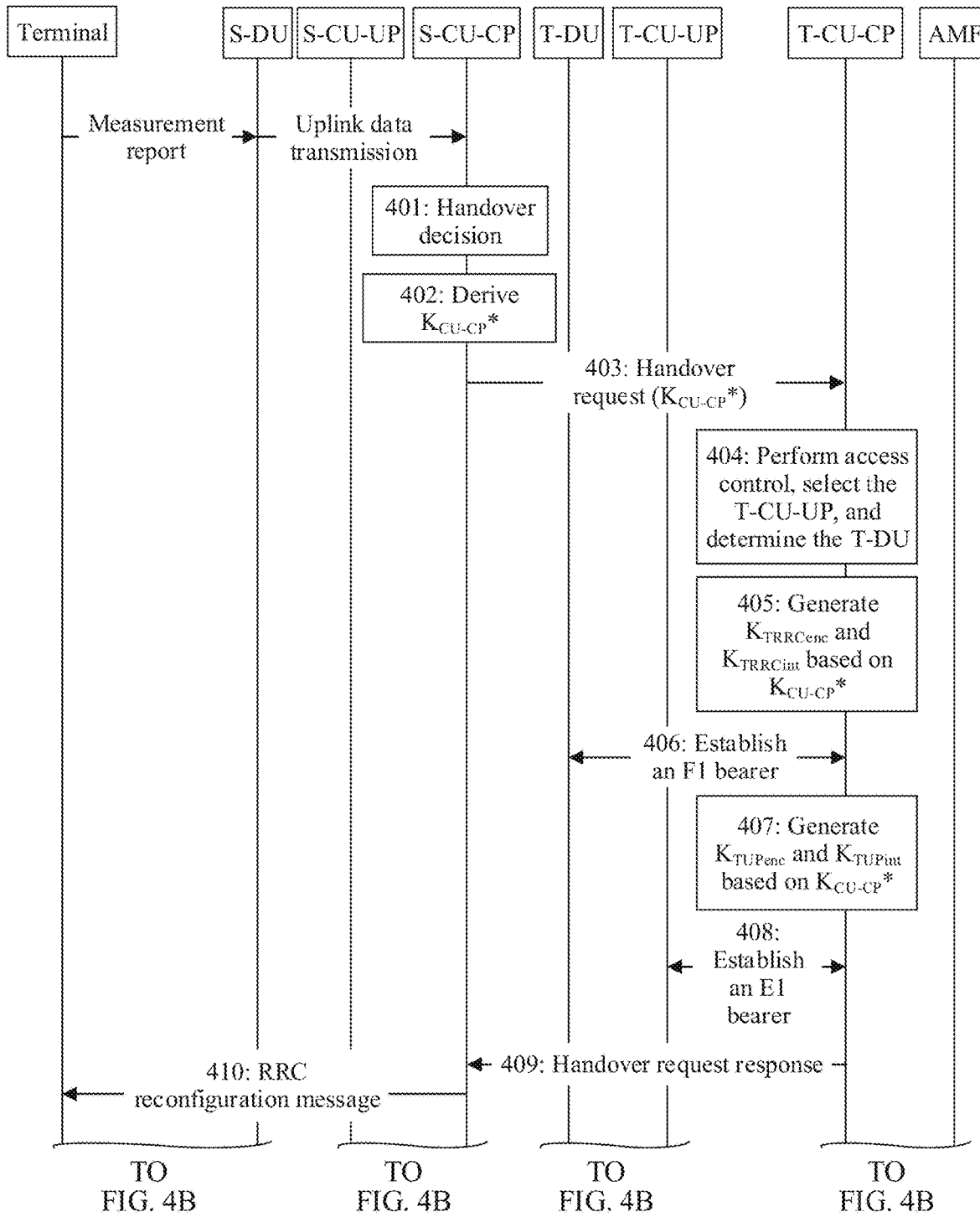
FIG. 4A and FIG. 4B are a schematic communication diagram of a key generation method in a first mobility scenario according to an embodiment of this application.
Figure 4B:
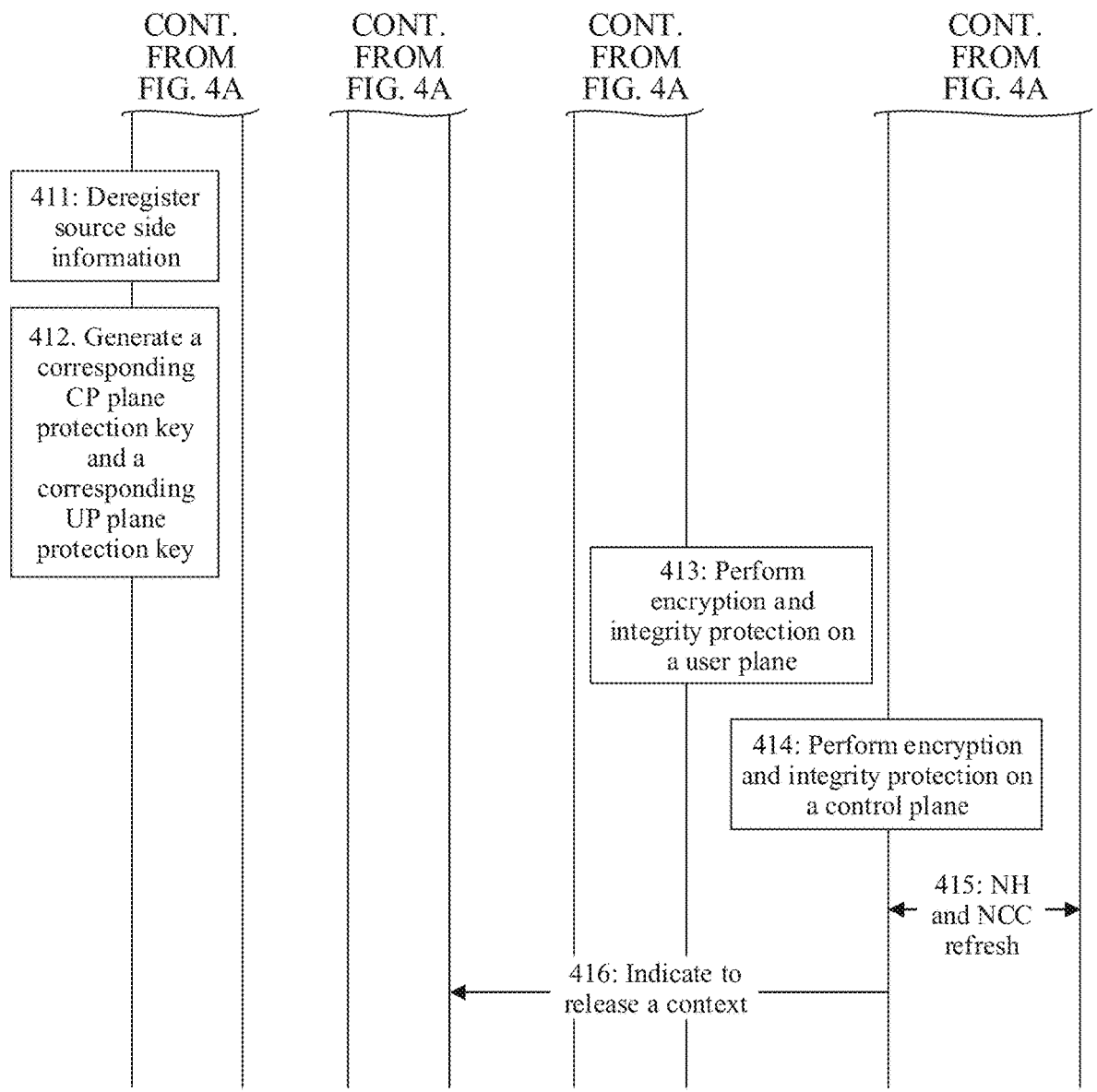

FIG. 4A and FIG. 4B are a schematic communication diagram of a key generation method in the first mobility scenario according to an embodiment of this application. The method shown in FIG. 4A and FIG. 4B is applicable to the first mobility scenario shown in FIG. 2E. It needs to be noted that the method shown in FIG. 4A and FIG. 4B is performed based on the following preconditions:

(1) keys already owned by a terminal include $K_{AMF}$, $K_{gNB}$, $K_{SUPenc}$, $K_{SUPint}$, $K_{SRRCenc}$, $K_{SRRCint}$, and a key-related parameter {NCC=0}, and in this case, NH on a terminal side associated with the NCC is void or empty;

(2) keys already owned by the S-CU-UP include $K_{SUPenc}$ and $K_{SUPint}$;

(3) keys already owned by the AMF include $K_{AMF}$, $K_{gNB}$, and {NH, NCC=1};

(4) mutual trust is achieved between the S-CU-CP and the S-CU-UP, to be specific, an E1 interface between the S-CU-CP and the S-CU-UP is a protected secure channel; and (5) mutual trust is achieved between the T-CU-CP and the T-CU-UP, to be specific, an E1 interface between the T-CU-CP and the T-CU-UP is a protected secure channel.

Based on this, the method shown in FIG. 4A and FIG. 4B specifically includes the following steps.

Step 401: The S-CU-CP makes a handover decision.

Specifically, the S-CU-CP determines that the terminal needs to be handed over from the S-CU-CP, the S-CU-UP, and the S-DU to the T-CU-CP, the T-CU-UP, and the T-DU.

Step 402: The S-CU-CP derives $K_{CU-CP}*$.

Specifically, there may be the following two derivation manners:

Derivation manner 1:

The S-CU-CP generates $K_{gNB}*$ based on $K_{gNB}$, a PCI, and EARFCN_DL, and then generates $K_{CU-CP}*$ based on $K_{gNB}*$ and a T-CU-CP ID. Optionally, $K_{CU-CP}*$ may be generated based on another key derivation parameter in addition to $K_{gNB}*$ and the T-CU-CP ID. For example, specifically, $K_{gNB}*$=KDF ($K_{gNB}$, the PCI, EARFCN_DL), and $K_{CU-CP}*$=KDF ($K_{gNB}*$, the T-CU-CP ID, the another key derivation parameter).

The foregoing another key derivation parameter may include at least one of the following: an instance ID, a CU-UP ID, a CU ID, a gNB identifier, a CU-CP ID, a DU ID, a flow ID, bearer information, session information, a slice ID, a MAC layer identifier, an RRC signaling counter, a NAS count, and a fresh parameter. If the fresh parameter is used, the parameter needs to be finally sent to UE, and the fresh parameter may be a count, a nonce, a random number, or the like.

The ID (identity) herein may be understood as a particular parameter that can identify a network entity. For example, the instance ID is a particular parameter that identifies an instance, and the CU-UP ID is a particular parameter that identifies a CU-UP.

Derivation manner 2:

The S-CU-CP generates $K_{CU-CP}$ based on $K_{gNB}$, and then generates $K_{CU-CP}*$ based on $K_{CU-CP}$ and a T-CU-CP ID. For example, $K_{CU-CP}*$=KDF ($K_{CU-CP}$, the T-CU-CP ID, and another key derivation parameter).

Step 403: The S-CU-CP sends a handover request to the T-CU-CP, where the handover request includes $K_{CU-CP}*$, an NCC, and a security algorithm on a source side.

The security algorithm on the source side includes a security capability of the terminal.

For example, the handover request may further include the count. The count may be a counted quantity of times of generating $K_{CU-CP}*$. That is, the count is a count.

Alternatively, the count may be introduced or calculated on a target side. Therefore, when generating $K_{CU-CP}*$, the T-CU-CP may select a start count to indicate that a new round of transformation starts for the key on the target side.

Optionally, the handover request may be an Xn handover request.

Step 404: The T-CU-CP performs access control, selects the T-CU-UP, and determines the T-DU.

Step 405: The T-CU-CP generates $K_{TRRCenc}$ and $K_{TRRCint}$ based on $K_{CU-CP}*$.

Specifically, the T-CU-CP may generate $K_{TRRCenc}$ and $K_{TRRCint}$ based on $K_{CU-CP}*$ and the selected algorithm.

For example, the following generation manner may be used:

The T-CU-CP generates $K_{TRRCenc}$ based on $K_{CU-CP}*$, a target side control plane encryption algorithm identifier, a target side control plane encryption algorithm type identifier, and another key derivation parameter. For example, $K_{TRRCenc}$=KDF ($K_{CU-CP}*$, the target side control plane encryption algorithm identifier, the target side control plane encryption algorithm type identifier, and the another key derivation parameter). The T-CU-CP generates $K_{TRRCint}$ based on $K_{CU-CP}*$, a target side control plane integrity algorithm identifier, a target side control plane integrity algorithm type identifier, and another key derivation parameter. For example, $K_{TRRCint}$=KDF ($K_{CU-CP}*$, the target side control plane integrity algorithm identifier, the target side control plane integrity algorithm type identifier, and the another key derivation parameter).

For example, the foregoing algorithm may be selected in the following manner:

An algorithm priority list of the T-CU-CP is preset in the T-CU-CP. When generating the key, the T-CU-CP needs to consider a local algorithm priority list.

Step 406: The T-CU-CP establishes an F1 bearer to the T-DU.

The T-CU-CP may notify the T-DU of bearer establishment related information such as TEID information in an establishment process of the F1 bearer. Optionally, the T-CU-CP may further send context information of the terminal to the T-DU in this process.

Alternatively, the T-DU may send the bearer information, the session information, the TEID information, the T-CU-UP ID, the T-DU ID, or the like to the T-CU-CP in this process.

Step 407: The T-CU-CP generates $K_{TUPenc}$ and $K_{TUPint}$ based on $K_{CU-CP}*$.

Specifically, the T-CU-CP may generate $K_{TUPenc}$ and $K_{TUPint}$ based on $K_{CU-CP}*$, the selected algorithm, and the bearer information, the session information, the TEID information, the T-CU-UP ID, the T-DU ID, or the like that is sent by the T-DU. For example, $K_{TUPenc}$=KDF ($K_{CU-CP}*$, at least one of a bear ID, a DRB ID, and a session ID, a user plane encryption algorithm identifier managed by the T-CU-UP, a user plane encryption algorithm type identifier managed by the T-CU-UP, and another key derivation parameter). $K_{TUPint}$=KDF ($K_{CU-CP}*$, at least one of a bear ID, a DRB ID, and a session ID, a user plane integrity algorithm identifier managed by the T-CU-UP, a user plane integrity algorithm type identifier managed by the T-CU-UP, and another key derivation parameter).

For example, the foregoing algorithm may be selected in the following two manners:

Selection manner 1:

An algorithm priority list of one or more CU-UPs managed by the T-CU-CP is preset in the T-CU-CP. When generating a key, the T-CU-CP needs to consider a local algorithm priority of the CU-UP. Alternatively, algorithms and algorithm priorities of a CP plane and a UP plane may be the same, and only a unified algorithm and a unified algorithm priority are configured in the T-CU-CP. In this case, the T-CU-CP may refer to the unified algorithm and the unified algorithm priority when generating the key. Alternatively, algorithms and algorithm priorities of the CP plane and the UP plane may be different. In this case, when generating a CP plane key, the T-CU-CP refers to a security algorithm configuration of the CP plane, and when generating a UP plane key, the T-CU-CP refers to a security algorithm configuration of the UP plane.

Selection manner 2:

The algorithm priority list of the T-CU-UP is stored in the T-CU-UP. The T-CU-CP may send a request to the T-CU-UP, and then the T-CU-UP sends the algorithm priority list of the T-CU-UP to the T-CU-CP.

It needs to be noted that because priorities of algorithms supported by different CU-UPs may be different, user plane keys corresponding to the different CU-UPs may also be different.

Optionally, if the handover request in step 403 includes a count, and the source side does not execute an action of adding 1, the count is increased by 1. Alternatively, the target side defines a count at this time and adds 1 to the count.

Step 408: The T-CU-CP establishes an E1 bearer to the T-CU-UP.

The T-CU-CP may send $K_{TUPenc}$ and $K_{TUPint}$ to the T-CU-UP in an establishment process of the E1 bearer. Optionally, the T-CU-CP may further send a corresponding security algorithm to the T-CU-UP in this process.

Step 409: The T-CU-CP sends a handover request response to the S-CU-CP.

Optionally, the handover request response may include at least one of the following content: an identifier of the target side, a fresh parameter, and a security algorithm on the target side. The identifier of the target side may include the T-DU ID, the T-CU-CP ID, the T-CU-UP ID, and the like. The fresh parameter may include a fresh parameter such as a count, a nonce, and a random number that is used to calculate a target side key. That is, parameters used to calculate a target side CP plane key and a target side UP plane key need to be included.

In a possible implementation, the information included in the foregoing handover request response may be sent through a transparent container.

For example, the foregoing handover request response may be an $X_n$ handover request response.

Step 410: The S-CU-CP sends an RRC reconfiguration message to the terminal.

The RRC reconfiguration message includes a parameter used by the terminal to derive a control plane key and a parameter used by the terminal to derive a user plane key. For example, the parameter used by the terminal to derive the control plane key includes at least one of the following: a target side PCI, a downlink frequency, the T-CU-CP ID, a T-CU-ID, a target side control plane algorithm identifier, and a target side control plane algorithm type identifier, and another key derivation parameter; and the parameter used by the terminal to derive the user plane key includes at least one of the following: at least one of a bear ID, a DRB ID, and a session ID, an algorithm identifier managed by the T-CU-UP, an algorithm type identifier managed by the T-CU-UP, and another key derivation parameter.

Optionally, the RRC reconfiguration message may further include at least one of the following content: an identifier of the target side, a fresh parameter, and a security algorithm on the target side. The identifier of the target side may include the T-DU ID, the T-CU-CP ID, the T-CU-UP ID, and the like. The fresh parameter may include a count, a nonce, and the like.

In a possible implementation, the information included in the foregoing RRC reconfiguration message may be sent through a transparent container.

Step 411: The terminal deregisters source side information.

Step 412: The terminal generates a corresponding control plane protection key and a corresponding user plane protection key based on the parameter carried in the RRC reconfiguration message.

Step 413: The T-CU-UP performs encryption and integrity protection on the user plane.

Specifically, the T-CU-UP may perform bearer- or session-based encryption and integrity protection on the user plane.

Step 414: The T-CU-CP performs encryption and integrity protection on the control plane.

In this way, corresponding control plane signaling transmission and user plane data transmission may be securely performed between the terminal and the T-CU-CP and between the terminal and the T-CU-UP.

Step 415: The T-CU-CP refreshes the NH and the NCC in a handover process with the AMF.

The refresh process includes update of path switching information.

Step 416: The T-CU-CP indicates the S-CU-CP to release a context.

Figure 5A:
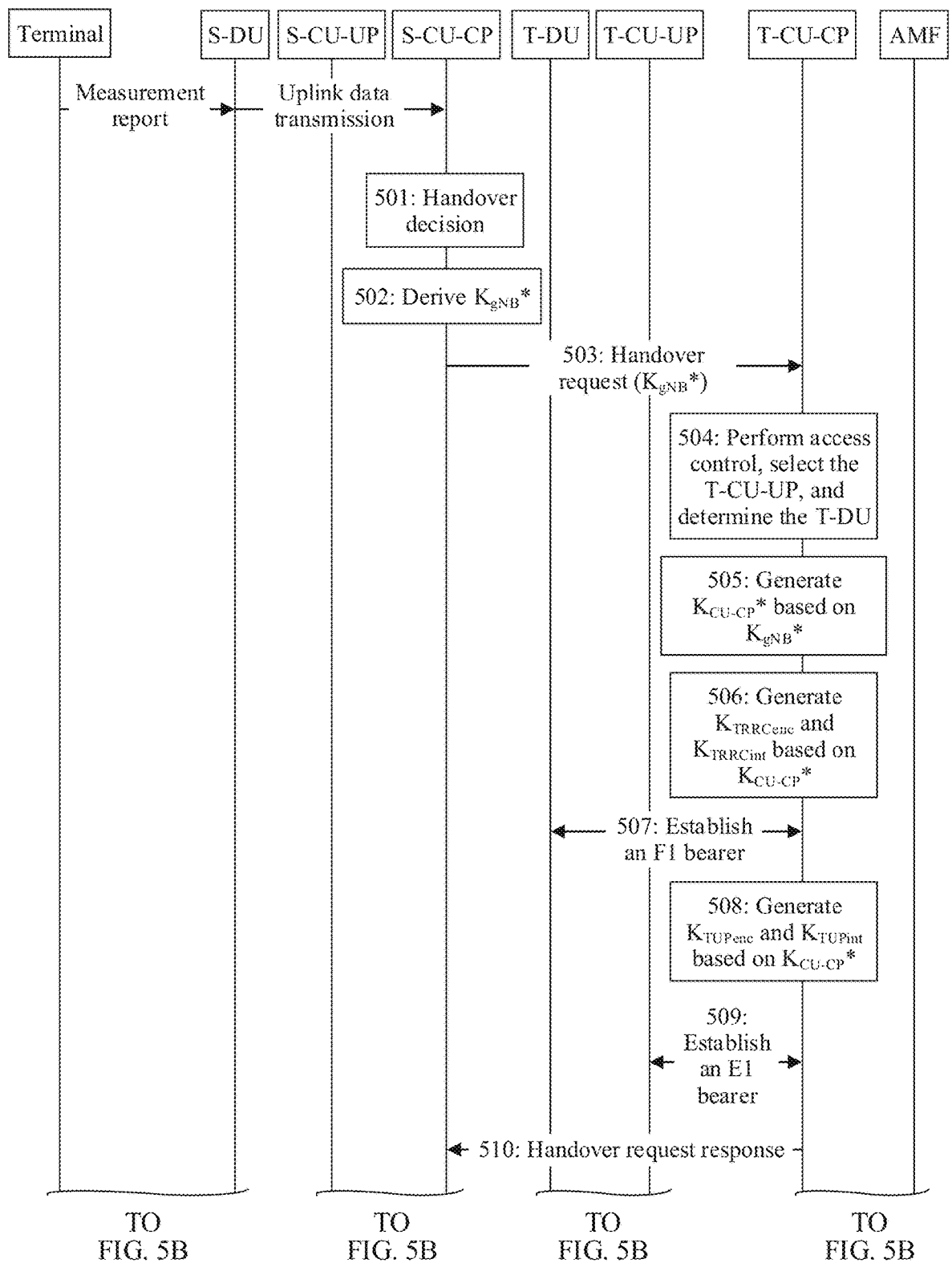
FIG. 5A and FIG. 5B are a schematic communication diagram of another key generation method in a first mobility scenario according to an embodiment of this application.
Figure 5B:
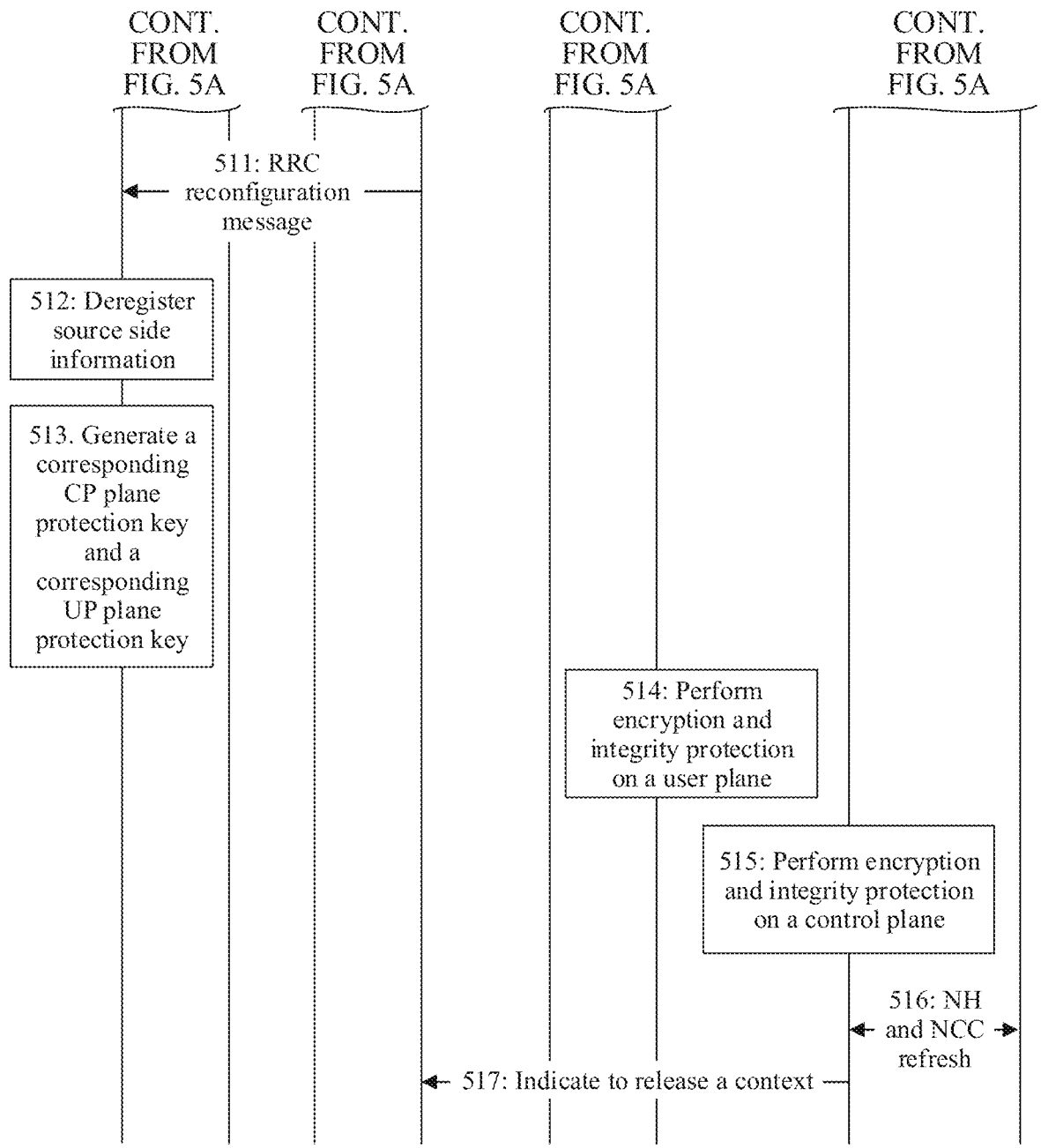

FIG. 5A and FIG. 5B are a schematic communication diagram of another key generation method in the first mobility scenario according to an embodiment of this application. The method shown in FIG. 5A and FIG. 5B is applicable to the first mobility scenario shown in FIG. 2E. The method shown in FIG. 5A and FIG. 5B is performed based on a same premise as that in FIG. 4A and FIG. 4B. In addition, for content that is the same as or similar to that in FIG. 4A and FIG. 4B in the method shown in FIG. 5A and FIG. 5B, refer to detailed descriptions in FIG. 4A and FIG. 4B. Details are not described again.

The method shown in FIG. 5A and FIG. 5B includes steps 501 to 517. Step 501 is the same as step 401, step 504 is the same as step 404, and steps 506 to 517 are the same as steps 404 to 416. Details are not described herein again.

A difference between the method shown in FIG. 5A and FIG. 5B and the method shown in FIG. 4A and FIG. 4B lies in steps 502, 503, and 505.

Step 502: The S-CU-CP derives $K_{gNB}*$.

Specifically, the S-CU-CP may generate $K_{gNB}*$ based on $K_{gNB}$, a PCI, and EARFCN_DL. For example, $K_{gNB}*$=KDF ($K_{gNB}$, the PCI, EARFCN_DL).

Step 503: The S-CU-CP sends a handover request to the T-CU-CP, where the handover request includes $K_{gNB}*$, an NCC, and a security algorithm on a source side.

The security algorithm on the source side includes a security capability of the terminal.

For example, the handover request may further include a count.

Optionally, the handover request may be an $X_n$ handover request.

Step 505: The T-CU-CP generates $K_{CU-CP}*$ based on $K_{gNB}*$.

For example, the T-CU-CP may directly generate $K_{CU-CP}*$ based on $K_{gNB}*$. Alternatively, the T-CU-CP may first generate $K_{CU-CP}$ based on $K_{gNB}*$, and then generate $K_{CU-CP}*$ based on $K_{CU-CP}$.

Figure 6A:
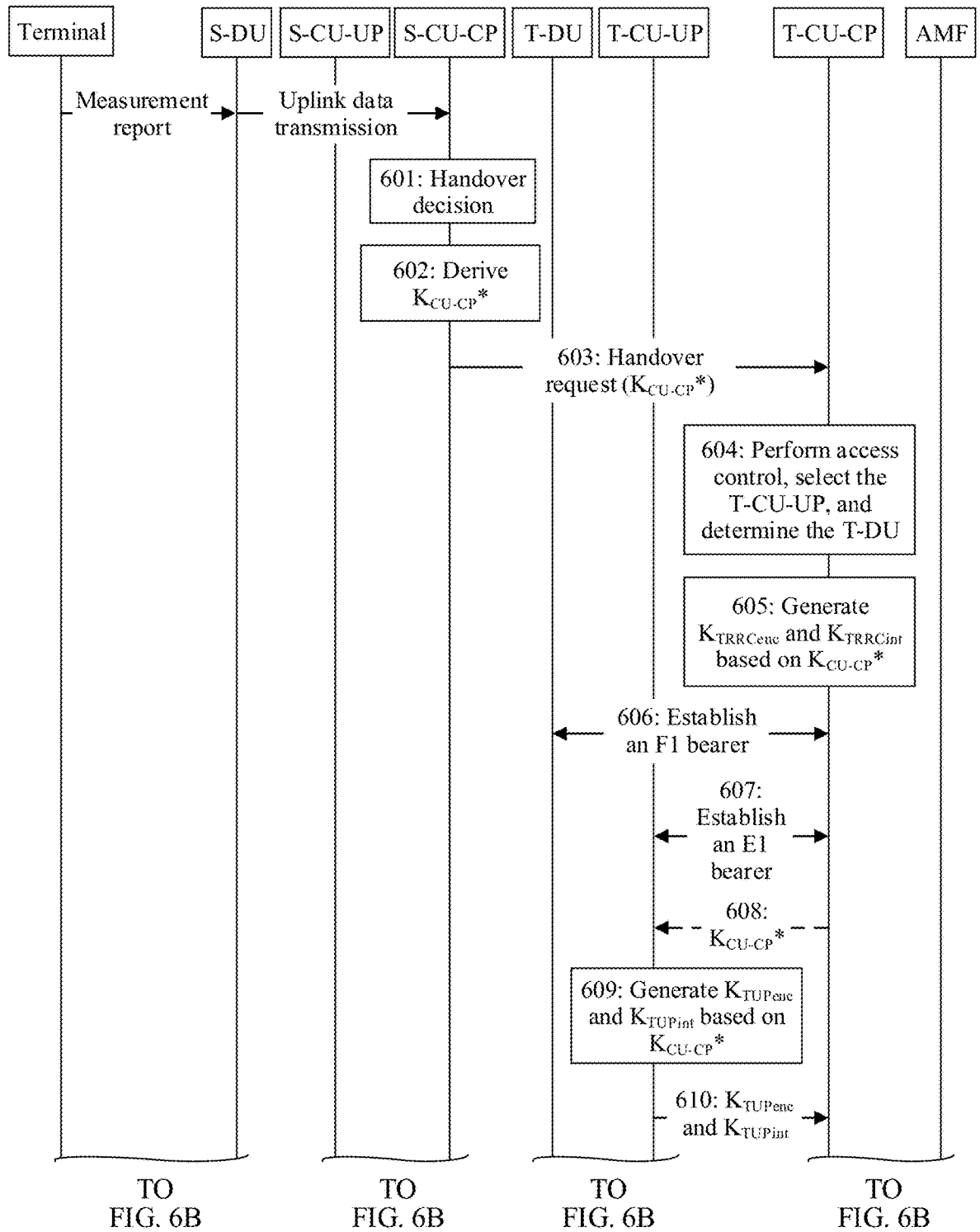
FIG. 6A and FIG. 6B are a schematic communication diagram of still another key generation method in a first mobility scenario according to an embodiment of this application.
Figure 6B:
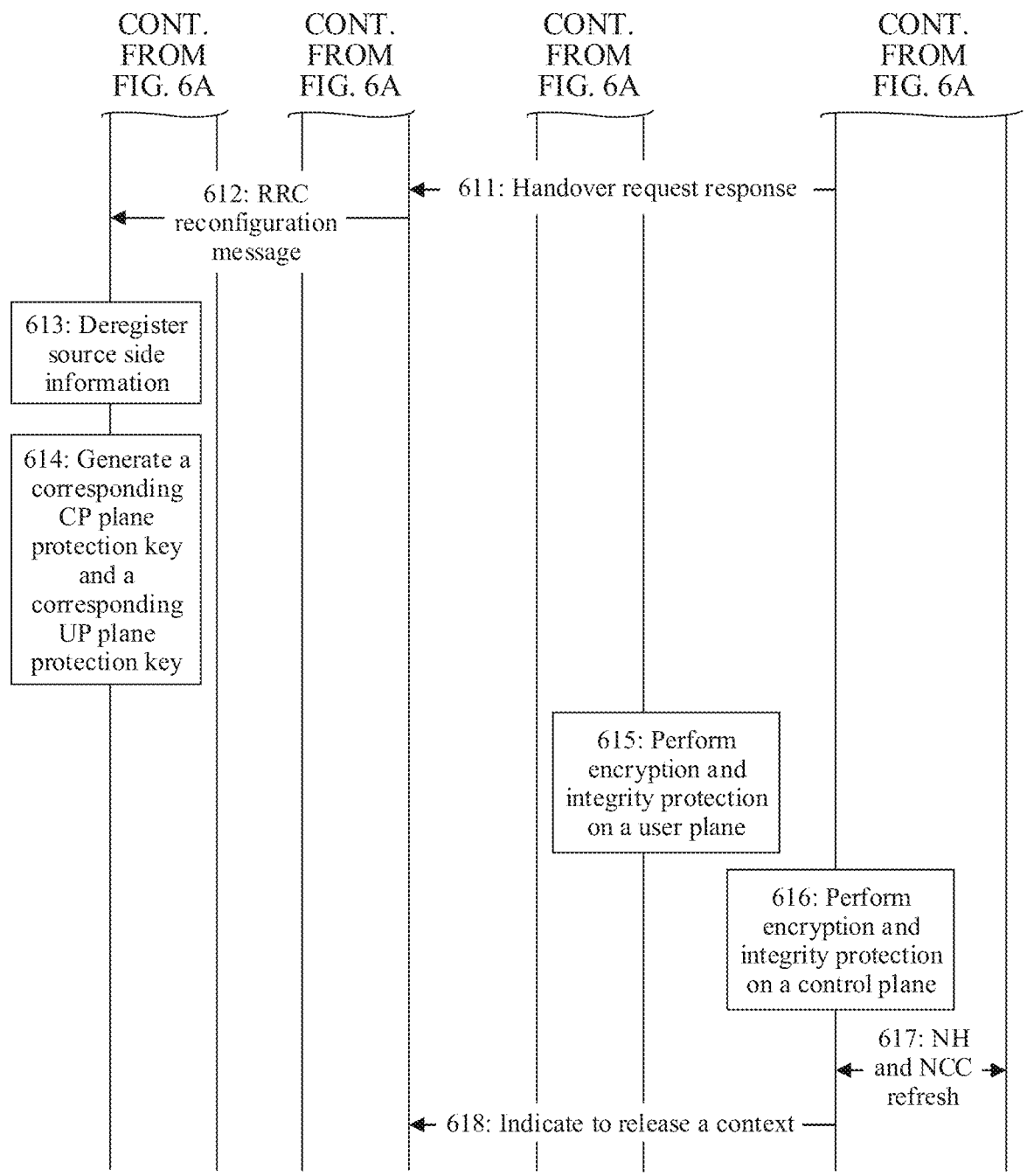

FIG. 6A and FIG. 6B are a schematic communication diagram of still another key generation method in the first mobility scenario according to an embodiment of this application. The method shown in FIG. 6A and FIG. 6B is applicable to the first mobility scenario shown in FIG. 2E. The method shown in FIG. 6A and FIG. 6B is performed based on a same premise as that in FIG. 4A and FIG. 4B. In addition, for content that is the same as or similar to that in FIG. 4A and FIG. 4B in the method shown in FIG. 6A and FIG. 6B, refer to detailed descriptions in FIG. 4A and FIG. 4B. Details are not described again.

The method shown in FIG. 6A and FIG. 6B includes steps 601 to 618. Steps 601 to 606 are the same as steps 401 to 406, and steps 611 to 618 are the same as steps 409 to 416. Details are not described herein again.

A difference between the method shown in FIG. 6A and FIG. 6B and the method shown in FIG. 4A and FIG. 4B lies in steps 607 to 610.

Step 607: The T-CU-CP establishes an E1 bearer to the T-CU-UP.

The T-CU-CP may send $K_{CU-CP}*$ to the T-CU-UP in an establishment process of the E1 bearer. In this case, step 608 is not performed.

Step 608: The T-CU-CP sends $K_{CU-CP}*$ to the T-CU-UP after the E1 bearer is established.

It needs to be noted that step 608 is optional. If the T-CU-CP does not send $K_{CU-CP}*$ to the T-CU-UP in the establishment process of the E1 bearer, step 608 is performed.

Step 609: The T-CU-UP generates $K_{TUPenc}$ and $K_{TUPint}$ based on $K_{CU-CP}*$.

Specifically, the T-CU-UP may generate $K_{TUPenc}$ and $K_{TUPint}$ based on $K_{CU-CP}*$ and a selected algorithm. A specific generation manner is similar to a generation manner of generating $K_{TUPenc}$ and $K_{TUPint}$ by the T-CU-CP in step 407 in FIG. 4A and FIG. 4B. Details are not described herein again.

For example, the foregoing algorithm may be selected in the following two manners:

Selection manner 1:

An algorithm priority list of one or more CU-UPs managed by the T-CU-CP is preset in the T-CU-CP, and the T-CU-CP sends a corresponding algorithm priority list to the T-CU-UP. Optionally, the T-CU-CP may send the corresponding algorithm priority list to the T-CU-UP after the T-CU-UP requests the algorithm priority list.

Selection manner 2:

The algorithm priority list of the T-CU-UP is stored in the T-CU-UP, and the T-CU-UP only needs to obtain the locally stored algorithm priority list.

Step 610: The T-CU-UP sends $K_{TUPenc}$ and $K_{TUPint}$ to the T-CU-CP.

Figure 7A:
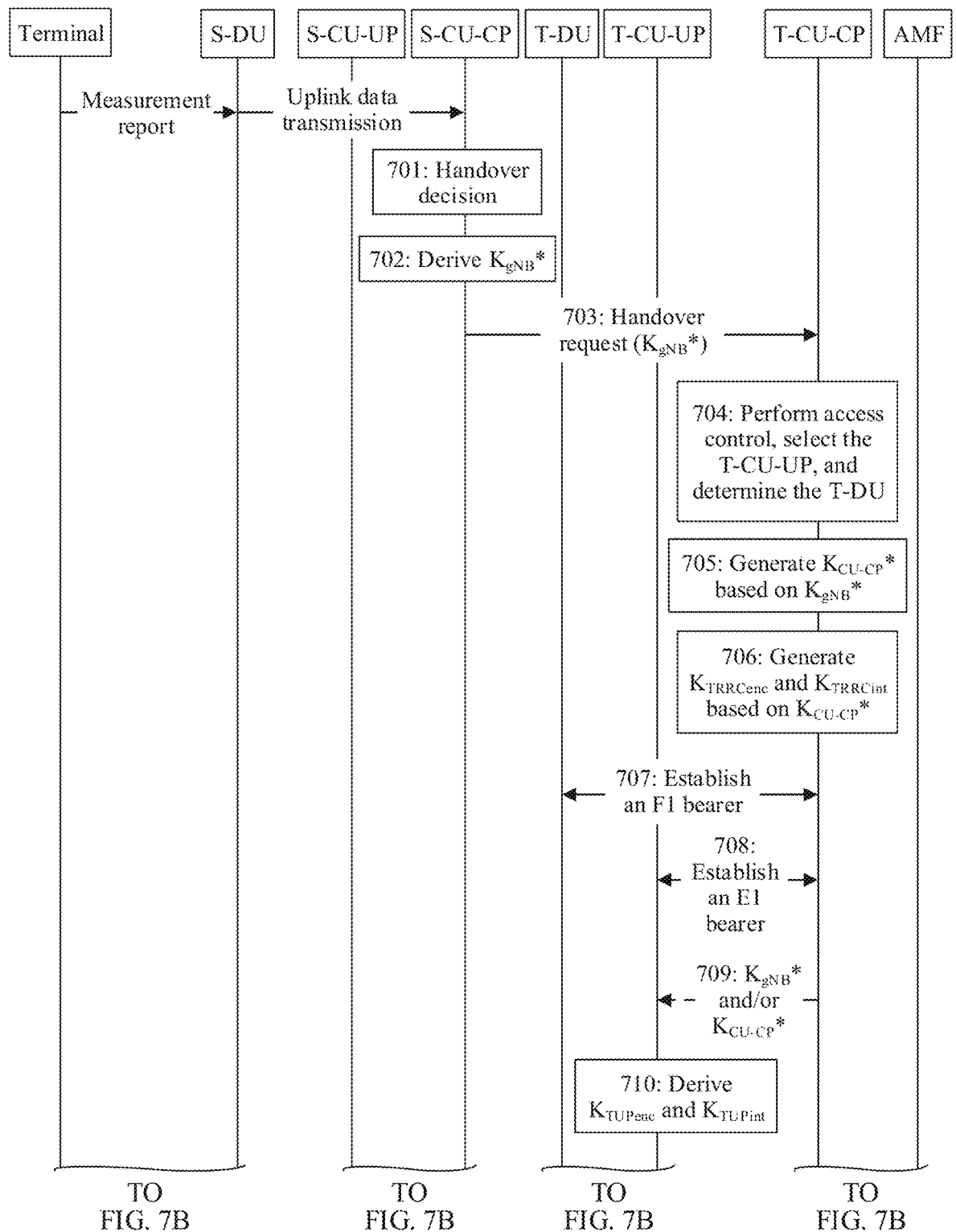
FIG. 7A and FIG. 7B are a schematic communication diagram of yet another key generation method in a first mobility scenario according to an embodiment of this application.
Figure 7B:
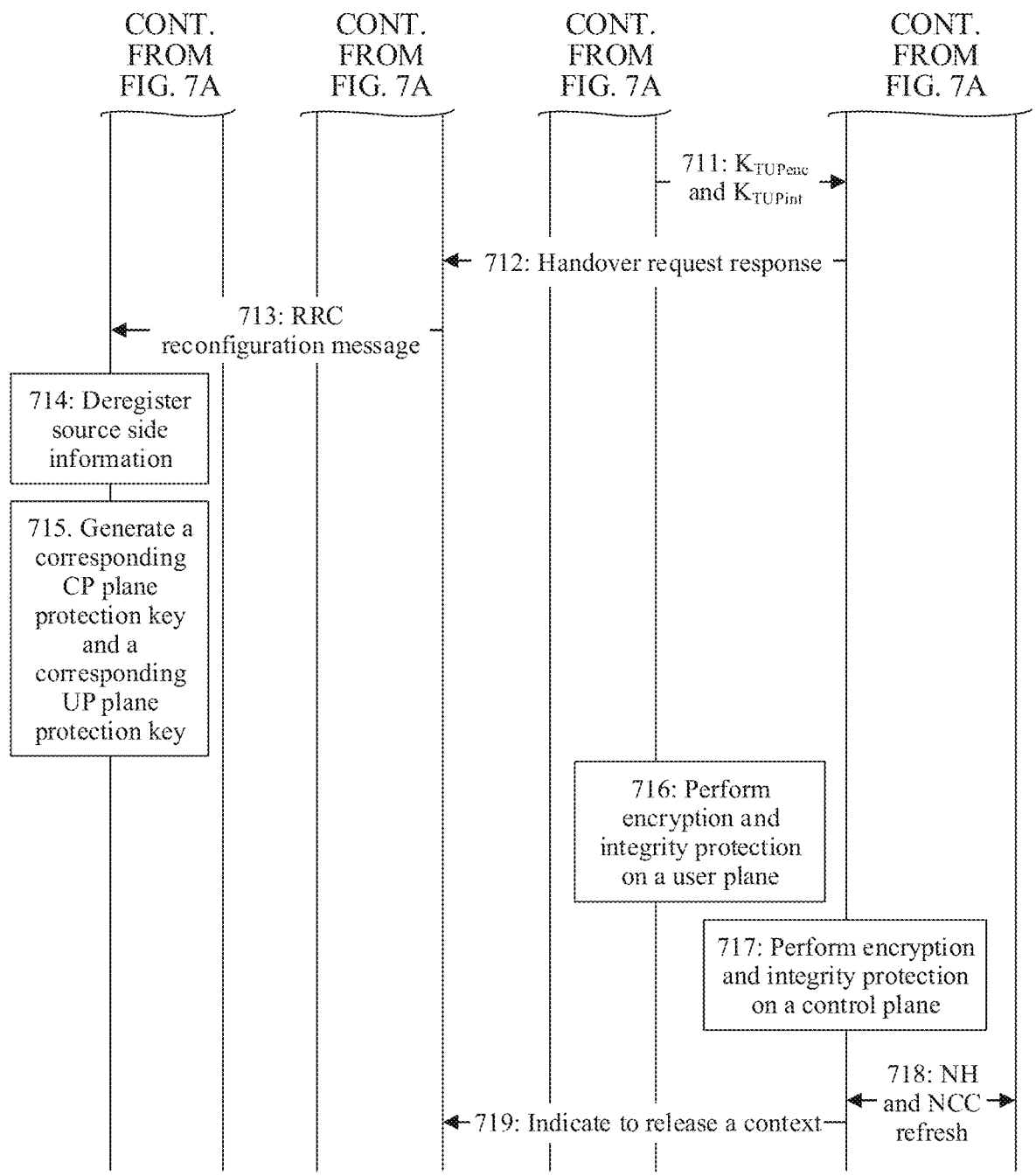

FIG. 7A and FIG. 7B are a schematic communication diagram of yet another key generation method in the first mobility scenario according to an embodiment of this application. The method shown in FIG. 7A and FIG. 7B is applicable to the first mobility scenario shown in FIG. 2E. The method shown in FIG. 7A and FIG. 7B is performed based on a same premise as that in FIG. 5A and FIG. 5B. In addition, for content that is the same as or similar to that in FIG. 5A and FIG. 5B in the method shown in FIG. 7A and FIG. 7B, refer to detailed descriptions in FIG. 5A and FIG. 5B. Details are not described again.

The method shown in FIG. 7A and FIG. 7B includes steps 701 to 718. Steps 701 to 707 are the same as steps 501 to 507, and steps 712 to 718 are the same as steps 510 to 517. Details are not described herein again.

A difference between the method shown in FIG. 7A and FIG. 7B and the method shown in FIG. 5A and FIG. 5B lies in steps 708 to 711.

Step 708: The T-CU-CP establishes an E1 bearer to the T-CU-UP.

The T-CU-CP may send $K_{gNB}*$ and/or $K_{CU-CP}*$ to the T-CU-UP in an establishment process of the E1 bearer. In this case, step 709 is not performed.

Step 709: The T-CU-CP sends $K_{gNB}*$ and/or $K_{CU-CP}*$ to the T-CU-UP after the E1 bearer is established.

It needs to be noted that step 709 is optional. If the T-CU-CP does not send $K_{gNB}*$ and/or $K_{CU-CP}*$ to the T-CU-UP in the establishment process of the E1 bearer, step 709 is performed.

Step 710: The T-CU-UP derives $K_{TUPenc}$ and $K_{TUPint}$.

Specifically, there may be the following three derivation manners:

Derivation manner 1: If the T-CU-UP receives $K_{gNB}*$, the T-CU-UP may first generate $K_{CU-CP}*$ based on $K_{gNB}*$. For example, the T-CU-UP may directly generate $K_{CU-CP}*$ based on $K_{gNB}*$. Alternatively, the T-CU-UP may first generate $K_{CU-CP}$ based on $K_{gNB}*$, and then generate $K_{CU-CP}*$ based on $K_{CU-CP}$. Then, the T-CU-UP generates $K_{TUPenc}$ and $K_{TUPint}$ based on $K_{CU-CP}*$. A process in which the T-CU-UP generates $K_{TUPenc}$ and $K_{TUPint}$ based on $K_{CU-CP}*$ is the same as step 609 in FIG. 6A and FIG. 6B. For details, refer to the descriptions in step 609. Details are not described herein again.

Derivation manner 1: If the T-CU-UP receives $K_{CU-CP}*$, the T-CU-UP generates $K_{TUPenc}$ and $K_{TUPint}$ based on $K_{CU-CP}*$. A process in which the T-CU-UP generates $K_{TUPenc}$ and $K_{TUPint}$ based on $K_{CU-CP}*$ is the same as step 609 in FIG. 6A and FIG. 6B. For details, refer to the descriptions in step 609. Details are not described herein again.

Derivation manner 3: If the T-CU-UP receives $K_{gNB}*$ and $K_{CU-CP}*$, the T-CU-UP may choose to derive $K_{TUPenc}$ and $K_{TUPint}$ based on $K_{gNB}*$ or $K_{CU-CP}*$. For a specific implementation, refer to the foregoing descriptions. Details are not described herein again.

Step 711: The T-CU-UP sends $K_{TUPenc}$ and $K_{TUPint}$ to the T-CU-CP.

It can be learned from the foregoing descriptions in FIG. 4A and FIG. 4B to FIG. 7A and FIG. 7B that, in the methods shown in FIG. 4A and FIG. 4B and FIG. 6A and FIG. 6B, $K_{CU-CP}*$ is derived by the S-CU-CP, and in the methods shown in FIG. 5A and FIG. 5B and FIG. 7A and FIG. 7B, $K_{CU-CP}*$ is derived by the T-CU-CP. In the methods shown in FIG. 4A and FIG. 4B and FIG. 5A and FIG. 5B, $K_{TUPenc}$ and $K_{TUPint}$ are derived by the T-CU-CP. In the methods shown in FIG. 6A and FIG. 6B and FIG. 7A and FIG. 7B, $K_{TUPenc}$ and $K_{TUPint}$ are derived by the T-CU-UP.

It needs to be noted that in this application, the S-CU-CP or the T-CU-CP may not derive $K_{CU-CP}*$, but the T-CU-CP or the T-CU-UP directly derives $K_{TUPenc}$ and $K_{TUPint}$ based on $K_{gNB}*$.

In a possible implementation, in the method shown in FIG. 5A and FIG. 5B, the T-CU-CP may not derive $K_{CU-CP}*$, but directly derive $K_{TRRCenc}$, $K_{TRRCint}$, $K_{TUPenc}$, and $K_{TUPint}$ based on $K_{gNB}*$. Specifically, in this case, step 505 is not performed. Step 506 is replaced with the following step: The T-CU-CP generates $K_{TRRCenc}$ and $K_{TRRCint}$ based on $K_{gNB}*$. Step 508 is replaced with the following step: The T-CU-CP generates $K_{TUPenc}$ and $K_{TUPint}$ based on $K_{gNB}*$.

Similarly, in a possible implementation, in the method shown in FIG. 7A and FIG. 7B, the T-CU-CP may not derive $K_{CU-CP}*$, but directly derive $K_{TRRCenc}$ and $K_{TRRCint}$ based on $K_{gNB}*$. Specifically, in this case, step 705 is not performed. Step 706 is replaced with the following step: The T-CU-CP generates $K_{TRRCenc}$ and $K_{TRRCint}$ based on $K_{gNB}*$. In addition, in step 709, the T-CU-CP sends $K_{gNB}*$ to the T-CU-UP. Correspondingly, in step 710, the T-CU-UP generates $K_{TUPenc}$ and $K_{TUPint}$ based on $K_{gNB}*$.

Figure 8:
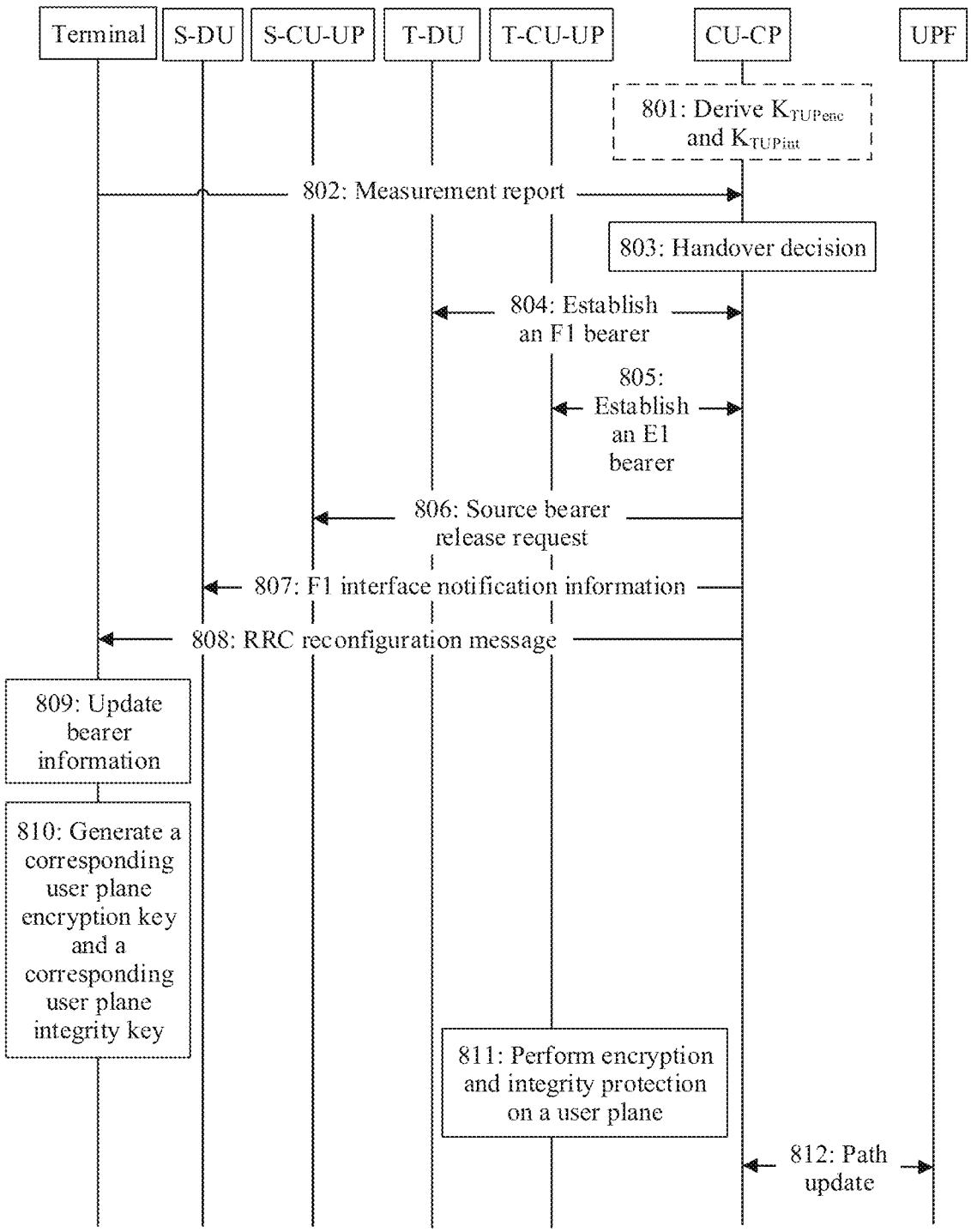
FIG. 8 is a schematic communication diagram of a key generation method in a second mobility scenario according to an embodiment of this application.

The foregoing describes various implementations of the solutions in the embodiments of this application in the first mobility scenario with reference to FIG. 4A and FIG. 4B to FIG. 7A and FIG. 7B. The following describes implementations of the solutions in the embodiments of this application in the second mobility scenario with reference to FIG. 8. In a method shown in FIG. 8, an example in which a first CU-CP is a control plane entity (represented as a CU-CP) of a centralized unit and a first CU-UP is a user plane entity (represented as a T-CU-UP) of a target centralized unit in FIG. 8 is used for description. In addition, an S-DU represents a source distributed unit, an S-CU-UP represents a user plane entity of a source centralized unit, a T-DU represents a target distributed unit, and a UPF represents a user plane function entity.

FIG. 8 is a schematic communication diagram of a key generation method in the second mobility scenario according to an embodiment of this application. The method shown in FIG. 4A and FIG. 4B is applicable to the second mobility scenario shown in FIG. 2F. The method shown in FIG. 8 specifically includes the following steps.

Step 801: The CU-CP derives $K_{TUPenc}$ and $K_{TUPint}$.

Specifically, the CU-CP may derive $K_{TUPenc}$ and $K_{TUPint}$ based on $K_{gNB}$ or $K_{CU-CP}$.

In a possible implementation, the CU-CP generates $K_{TUPenc}$ and $K_{TUPint}$ based on $K_{gNB}$, a current security algorithm, and a CU-UP ID. For example, $K_{TUPenc}$=KDF ($K_{gNB}$, a current user plane encryption algorithm, a CU-UP ID). $K_{TUPint}$=KDF ($K_{gNB}$, a current user plane integrity algorithm, a CU-UP ID).

In another possible implementation, the CU-CP generates $K_{TUPenc}$ and $K_{TUPint}$ based on $K_{CU-CP}$, a current security algorithm, and a CU-UP ID. For example, $K_{TUPenc}$=KDF ($K_{CU-CP}$, a current user plane encryption algorithm, a CU-UP ID). $K_{TUPint}$=KDF ($K_{CU-CP}$, a current user plane integrity algorithm, a CU-UP ID).

It needs to be noted that step 801 is an optional step.

Step 802: The CU-CP receives a measurement report from a terminal.

For example, the terminal sends the measurement report to the CU-CP because the terminal moves to a range of the T-DU and the T-CU-UP.

Step 803: The CU-CP makes a handover decision.

Step 804: The CU-CP establishes an F1 bearer to the T-DU.

The CU-CP may notify the T-DU of bearer establishment related information such as TEID information in an establishment process of the F1 bearer. Optionally, the CU-CP may further send context information of the terminal to the T-DU in this process.

Alternatively, the T-DU may send the bearer information, the session information, the TEID information, the T-CU-UP ID, the T-DU ID, or the like to the CU-CP in this process.

Step 805: The CU-CP establishes an E1 bearer to the T-CU-UP.

It needs to be noted that if step 801 is not performed, the CU-UP derives $K_{TUPenc}$ and $K_{TUPint}$ in an establishment process of an E1 bearer. For a specific derivation process, refer to the descriptions in step 801. Details are not described herein again. If step 801 is performed, the CU-UP derives $K_{TUPenc}$ and $K_{TUPint}$ not in the establishment process of the E1 bearer.

The CU-CP may send $K_{TUPenc}$ and $K_{TUPint}$ to the T-CU-UP in the establishment process of the E1 bearer. Optionally, the CU-CP may further send a corresponding security algorithm to the T-CU-UP in this process.

Step 806: The CU-CP sends a source bearer release request to the S-CU-UP.

The source bearer release request may include an indication of the T-CU-UP, a change indication of the CU-UP, data forwarding information, and the like.

Step 807: The CU-CP sends F1 interface notification information to the S-DU.

The F1 interface notification information includes context information, a TEID, DRB change information, and the like of the terminal.

Further, the CU-CP may further indicate the S-DU to release a source context.

Step 808: The CU-CP sends an RRC reconfiguration message to the terminal.

The RRC reconfiguration message includes a parameter used by the terminal to derive a user plane key.

For example, the parameter used by the terminal to derive the user plane key includes at least one of the following: a T-DU ID, a T-CU-UP ID, and another key derivation parameter. Further, the parameter used by the terminal to derive the user plane key may further include a bandwidth and a new CRNTI allocated by the CU-CP to the terminal.

Step 809. The terminal updates bearer information.

Step 810: The terminal generates a corresponding user plane protection key based on the foregoing parameter.

Step 811. The T-CU-UP performs bearer- or session-based encryption protection and integrity protection on a user plane.

Step 812: Path update is performed between the CU-CP and the UPF.

In addition to the foregoing key generation method and key transmission method, an embodiment of this application further provides a security context obtaining method, a unified data storage network element based on the method, a control plane entity of a first centralized unit, and a user plane entity of a centralized unit. The method includes: receiving, by the unified data storage network element, a security context from the control plane entity of the centralized unit, where the security context includes a user plane security context and a control plane security context; storing, by the unified data storage network element, the security context; and sending, by the unified data storage network element, the security context to the user plane entity of the centralized unit.

In a possible implementation, the unified data storage network element may send the security context to the user plane entity of the centralized unit based on credential information. The credential information is a credential used by the user plane entity of the centralized unit to obtain the security context from the unified data storage network element. For example, the credential information may be a token. Further, the credential information may be allocated by the control plane entity of the centralized unit. Alternatively, the credential information may be generated by the unified data storage network element.

The unified data storage network element may be an unstructured data storage function (UDSF) entity.

The UDSF entity is a public security entity and may store all security-related information. The security-related information may include control plane security information and user plane security information. For example, the control plane security information may include a security algorithm, including an encryption algorithm type, an encryption algorithm type identifier, an integrity algorithm type, an integrity algorithm type identifier, a security capability of UE, a security capability of an access network element, a security capability of a network side, an algorithm priority list of the UE and the network side, an algorithm priority list of the access network element, and the like. The user plane security information may include a user plane security algorithm, including an encryption algorithm type, an encryption algorithm type identifier, an integrity algorithm type, an integrity algorithm type identifier, a security capability of UE, a security capability of an access network element, and a security capability of a network side, an algorithm priority list of the UE and the network side, an algorithm priority list of the access network element, and the like. The UDSF may further include a security key, a key lifetime, a key set identifier (KSI), and a parameter related to key generation, for example, a fresh parameter, a NAS COUNT, and a PCI. The UDSF may store the security context obtained from the CU-CP, or may generate the security context. One CU-CP or one CU-UP may obtain required security information from the UDSF.

In actual deployment, the UDSF may be an independent entity, or may be co-deployed with the CU-CP, or may be co-deployed with another network element. This is not limited in this embodiment of this application.

Figure 9:
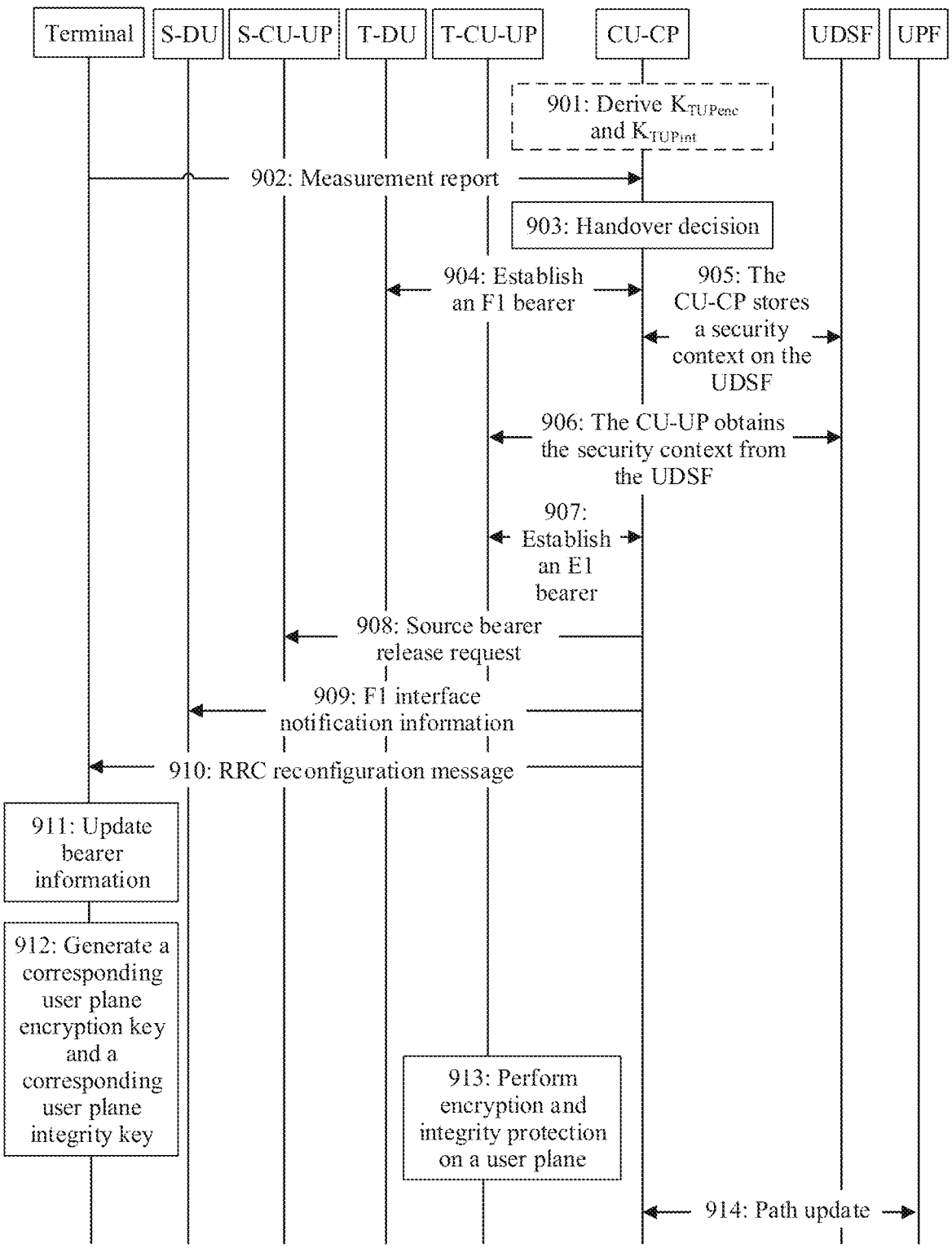
FIG. 9 is a schematic communication diagram of another key generation method in a second mobility scenario according to an embodiment of this application.

Based on the method shown in FIG. 8, FIG. 9 is a schematic diagram of another key generation method in the second mobility scenario according to an embodiment of this application. In the method shown in FIG. 9, for content that is the same as or similar to that in FIG. 8, refer to the detailed descriptions in FIG. 8. Details are not described again subsequently.

Compared with the method shown in FIG. 8, a CU-CP and an interaction process between a T-CU-UP and a UDSF are added to the method shown in FIG. 9.

The following describes the method shown in FIG. 9. The method shown in FIG. 9 includes steps 901 to 914. Steps 901 to 904 are the same as steps 801 to 804 in FIG. 8, and steps 907 to 914 are the same as steps 805 to 812 in FIG. 8. For details, refer to the detailed descriptions in FIG. 8. Details are not described herein again. A main difference between the method shown in FIG. 9 and the method shown in FIG. 8 lies in that step 905 and step 906 are added to the method shown in FIG. 9.

Step 905: The CU-CP stores the security context on the UDSF.

Specifically, the CU-CP may store the security context and other related information on the UDSF. The security context generally refers to a key, a key identifier, a security capability of UE, an algorithm priority list (UE, an access network element, and a core network (AMF)), and a parameter related to key calculation, for example, a NAS COUNT, and a pair of {NH, NCC}.

The other related information may include: a source side ID identifier, a target side ID identifier, a key length, a key generation period, a frequency, a cell identifier, a session ID, a bear ID, and a flow ID, and may further include slice-related information, and the like.

For example, the CU-CP may alternatively allocate one token to the UDSF.

Alternatively, the UDSF may send one token to the CU-CP. The token is a credential that allows a target side CU-CP to access the UDSF. For example, content of the token is a T-CU-CP ID, a T-CU-UP ID, a session ID, a bear ID, a flow ID, an expiry time/date, an identifier of the UDSF, and a service scope of authorized access (for example, a key may be obtained, and an algorithm may be obtained).

Step 906: The T-CU-UP obtains the security context from the UDSF.

For example, the T-CU-UP may obtain the security context from the UDSF based on the token. For example, the T-CU-UP sends a request to the UDSF, and the request is used to request the security context and the request carries the token. Correspondingly, after receiving the request carrying the token, the UDSF sends the security context to the T-CU-UP.

It needs to be noted that in the foregoing method examples, when the second CU-CP (or the S-CU-CP) transmits information (for example, the security capability of the terminal) to the first CU-CP (or the T-CU-CP), an indication identifier of integrity protection and/or encryption protection of a UP plane, a DRB, or a session may further be transmitted during transmission. Correspondingly, to ensure that a service is not interrupted when the terminal moves, the first CU-CP (or the T-CU-CP) needs to determine, based on the indication identifier, whether to enable the integrity protection and/or the encryption protection of the UP plane, the DRB, or the session. If the integrity protection and/or the encryption protection of the UP plane, the DRB, or the session are/is enabled, the first CU-CP (or the T-CU-CP) further performs corresponding processing of integrity protection and/or encryption protection, and notifies the corresponding CU-UP and/or DU.

The foregoing mainly describes the solutions provided in the embodiments of this application from a perspective of interaction between different network elements. It may be understood that, to implement the foregoing functions, the control plane entity of the first centralized unit, the user plane entity of the first centralized unit, the unified data storage network element, and the terminal include corresponding hardware structures and/or software modules for performing the functions. With reference to the units and algorithm steps described in the embodiments disclosed in this application, the embodiments of this application can be implemented in a form of hardware or hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

In the embodiments of this application, the control plane entity of the first centralized unit, the user plane entity of the first centralized unit, the unified data storage network element, the terminal, and the like may be divided into function units based on the foregoing method examples. For example, function units may be obtained through division based on corresponding functions, or two or more functions may be integrated into one processing unit. The integrated unit may be implemented in a form of hardware, or may be implemented in a form of a software function unit. It needs to be noted that, in the embodiments of this application, unit division is an example, and is merely a logical function division. During actual implementation, another division manner may be used.

Figure 10:
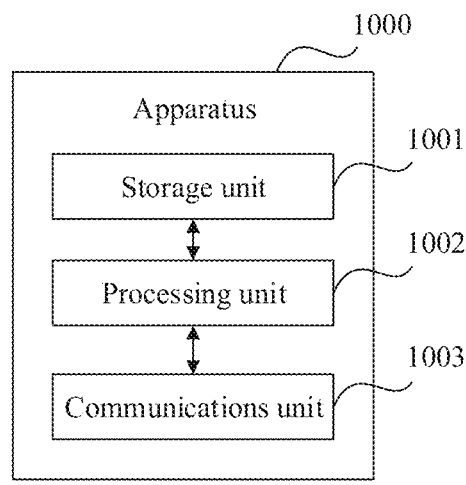
FIG. 10 is a schematic block diagram of an apparatus according to an embodiment of this application.

When an integrated unit is used, FIG. 10 is a possible example block diagram of an apparatus according to an embodiment of this application. The apparatus 1000 may exist in a form of software, hardware, or a combination of software and hardware. The apparatus 1000 includes a processing unit 1002 and a communications unit 1003. The processing unit 1002 is configured to control and manage an action of the apparatus. The communications unit 1003 is configured to support the apparatus in communicating with another device. The apparatus may further include a storage unit 1001, configured to store program code and data of the apparatus.

The apparatus 1000 shown in FIG. 10 may be a control plane entity of a first centralized unit, a user plane entity of the first centralized unit, or a unified data storage network element in the embodiments of this application.

When the apparatus 1000 shown in FIG. 10 is the control plane entity of the first centralized unit, the processing unit 1002 can support the apparatus 1000 in performing the actions completed by the control plane entity of the first centralized unit in the foregoing method examples. For example, the processing unit 1002 supports the apparatus 1000 in performing steps 301 and 302 in FIG. 3A, steps 404, 405, 407, and 414 in FIG. 4A and FIG. 4B, steps 504, 505, 506, 508, and 515 in FIG. 5A and FIG. 5B, steps 604, 605, and 616 in FIG. 6A and FIG. 6B, steps 704, 705, 706, and 717 in FIG. 7A and FIG. 7B, steps 801 and 803 in FIG. 8, and steps 901 and 903 in FIG. 9, and/or the processing unit 1002 can be configured to perform another process of the technology described in this specification. The communications unit 1003 can support communication between the apparatus 1000 and the user plane entity of the first centralized unit, a terminal, a control plane entity of a second centralized unit, a first distributed unit, an AMF, a UPF, and the like. For example, the communications unit 1003 supports the apparatus 1000 in performing steps 303 and 304 in FIG. 3A, steps 313 and 314 in FIG. 3B, steps 403, 406, 408, 409, 415, and 416 in FIG. 4A and FIG. 4B, steps 503, 507, 509, 510, 516, and 517 in FIG. 5A and FIG. 5B, steps 603, 606, 607, 608, 610, 611, 617, and 618 in FIG. 6A and FIG. 6B, steps 703, 707, 708, 709, 711, 712, 718, and 719 in FIG. 7A and FIG. 7B, steps 802, 804, 805, 806, 807, 808, and 812 in FIG. 8, and steps 902, 904, 905, 907, 908, 909, 910, and 914 in FIG. 9, and/or the communications unit 1003 can support another related communication process.

When the apparatus 1000 shown in FIG. 10 is the user plane entity of the first centralized unit, the processing unit 1002 can support the apparatus 1000 in performing the actions completed by the user plane entity of the first centralized unit in the foregoing method examples. For example, the processing unit 1002 supports the apparatus 1000 in performing steps 311 and 312 in FIG. 3B, step 413 in FIG. 4A and FIG. 4B, step 514 in FIG. 5A and FIG. 5B, steps 609 and 615 in FIG. 6A and FIG. 6B, steps 710 and 716 in FIG. 7A and FIG. 7B, step 811 in FIG. 8, and step 913 in FIG. 9, and/or the processing unit 1002 can be configured to perform another process of the technology described in this specification. The communications unit 1003 can support communication between the apparatus 1000 and the control plane entity of the first centralized unit. For example, the communications unit 1003 supports the apparatus 1000 in performing step 303 in FIG. 3A, step 313 in FIG. 3B, step 408 in FIG. 4A and FIG. 4B, step 509 in FIG. 5A and FIG. 5B, steps 607, 608, and 610 in FIG. 6A and FIG. 6B, steps 708, 709, and 711 in FIG. 7A and FIG. 7B, step 805 in FIG. 8, and steps 906 and 907 in FIG. 9, and/or the communications unit 1003 can support another related communication process.

When the apparatus 1000 shown in FIG. 10 is the unified data storage network element, the processing unit 1002 can support the apparatus 1000 in performing the actions completed by the unified data storage network element in the foregoing method examples. The communications unit 1003 can support communication between the apparatus 1000 and the control plane entity of the first centralized unit, the user plane entity of the first centralized unit, and the like. For example, the communications unit 1003 supports the apparatus 1000 in performing steps 905 and 906 in FIG. 9, and/or the communications unit 1003 can support another related communication process.

For example, the processing unit 1002 may be a processor or a controller, for example, a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processor may implement or execute various example logical blocks, units, and circuits described with reference to content disclosed in this application. The processor may be a combination of processors implementing a computing function, for example, a combination of one or more microprocessors, or a combination of the DSP and a microprocessor. The communications unit 1303 may be a communications interface, and the communications interface is a general term. During specific implementation, the communications interface may include one or more interfaces. The storage unit 1001 may be a memory.

Figure 11:
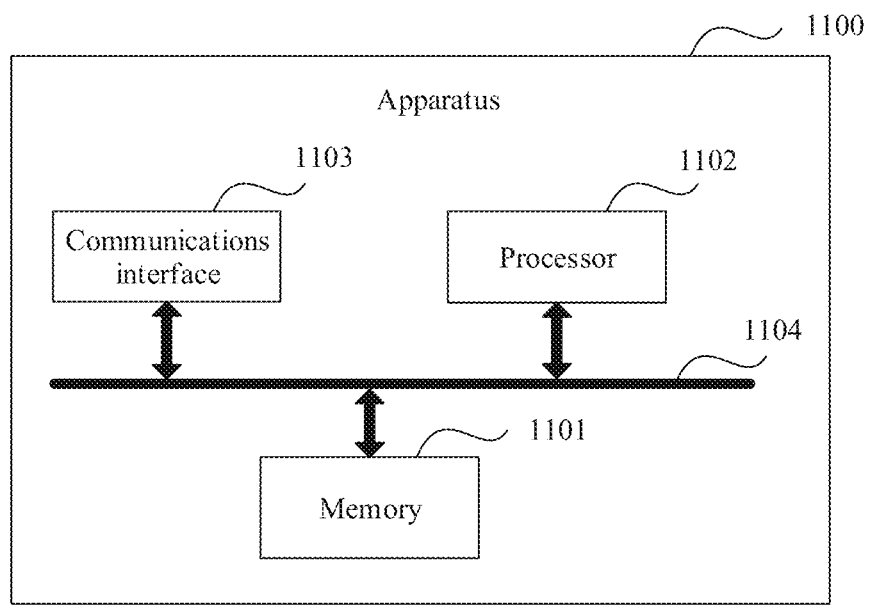
FIG. 11 is a schematic structural diagram of an apparatus according to an embodiment of this application.

When the processing unit 1002 is a processor, the communications unit 1003 is a communications interface, and the storage unit 1001 is a memory, the apparatus 1000 in this embodiment of this application may be an apparatus 1100 shown in FIG. 11.

Referring to FIG. 11, the apparatus 1100 includes a processor 1102 and a communications interface 1103. Further, the apparatus 1100 may further include a memory 1101. Optionally, the apparatus 1100 may further include a bus 1104. The communications interface 1103, the processor 1102, and the memory 1101 may be interconnected through the bus 1104. The bus 1104 may be a peripheral component interconnect (PCI) bus, an extended industry standard architecture (EISA) bus, or the like. The bus 1104 may be classified into an address bus, a data bus, a control bus, and the like. For ease of representation, only one thick line is used to represent the bus in FIG. 11, but this does not mean that there is only one bus or only one type of bus.

The processor 1102 may perform various functions of the apparatus 1100 by running or executing a program stored in the memory 1101.

For example, the apparatus 1100 shown in FIG. 11 may be a control plane entity of a first centralized unit, a user plane entity of the first centralized unit, or a unified data storage network element in this embodiment of this application.

When the apparatus 1100 is the control plane entity of the first centralized unit, the processor 1102 may perform, by running or executing the program stored in the memory 1101, the actions completed by the control plane entity of the first centralized unit in the foregoing method examples. When the apparatus 1100 is the user plane entity of the first centralized unit, the processor 1102 may perform, by running or executing the program stored in the memory 1101, the actions completed by the user plane entity of the first centralized unit in the foregoing method examples.

When the apparatus 1100 is the unified data storage network element, the processor 1102 may perform, by running or executing the program stored in the memory 1101, the actions completed by the unified data storage network element of the first centralized unit in the foregoing method examples.

Figure 12:
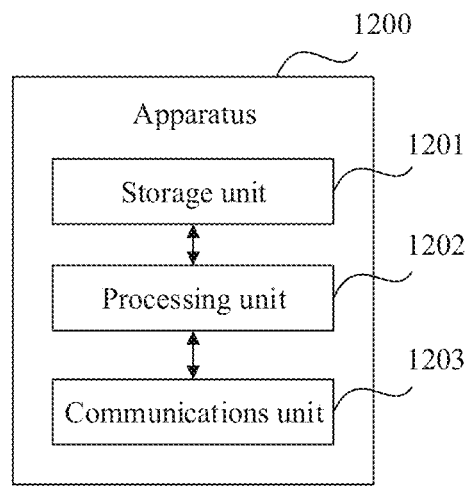
FIG. 12 is a schematic block diagram of another apparatus according to an embodiment of this application.

When an integrated unit is used, FIG. 12 is a possible example block diagram of another apparatus according to an embodiment of this application. The apparatus 1200 may exist in a form of software, hardware, or a combination of software and hardware. FIG. 12 is a possible schematic block diagram of an apparatus according to an embodiment of this application. The apparatus 1200 includes a processing unit 1202 and a communications unit 1203. The processing unit 1202 is configured to control and manage an action of the apparatus. The communications unit 1203 is configured to support the apparatus in communicating with another device. The apparatus may further include a storage unit 1201, configured to store program code and data of the apparatus.

The apparatus 1200 shown in FIG. 12 may be a terminal, or may be a chip applied to a terminal. The processing unit 1202 can support the apparatus 1200 in performing the actions completed by the terminal in the foregoing method examples. For example, the processing unit 1202 supports the apparatus 1202 in performing step 305 in FIG. 3A, step 315 in FIG. 3B, steps 411 and 412 in FIG. 4A and FIG. 4B, steps 512 and 513 in FIG. 5A and FIG. 5B, steps 613 and 614 in FIG. 6A and FIG. 6B, steps 714 and 715 in FIG. 7A and FIG. 7B, steps 809 and 810 in FIG. 8, and steps 911 and 912 in FIG. 9, and/or the processing unit 1202 can be configured to perform another process of the technology described in this specification. The communications unit 1203 can support communication between the apparatus 1200 and the control plane entity of the first centralized unit, a control plane entity of a second centralized unit, and the like. For example, the communications unit 1203 supports the apparatus 1200 in performing step 305 in FIG. 3A, step 315 in FIG. 3B, step 410 in FIG. 4A and FIG. 4B, step 511 in FIG. 5A and FIG. 5B, step 612 in FIG. 6A and FIG. 6B, step 713 in FIG. 7A and FIG. 7B, steps 802 and 808 in FIG. 8, and steps 902 and 910 in FIG. 9, and/or the communications unit 1203 can support another related communication process.

For example, the processing unit 1202 may be a processor or a controller, for example, may be a CPU, a general-purpose processor, a DSP, an ASIC, an FPGA, or another programmable logic device, a transistor logic device, a hardware component, or any combination thereof. The processor may implement or execute various example logical blocks, units, and circuits described with reference to content disclosed in this application. The processor may be a combination of processors implementing a computing function, for example, a combination of one or more microprocessors, or a combination of the DSP and a microprocessor. The communications unit 1203 may be a communications interface, and the communications interface is a general term. During specific implementation, the communications interface may include one or more interfaces. The storage unit 1201 may be a memory.

Figure 13:
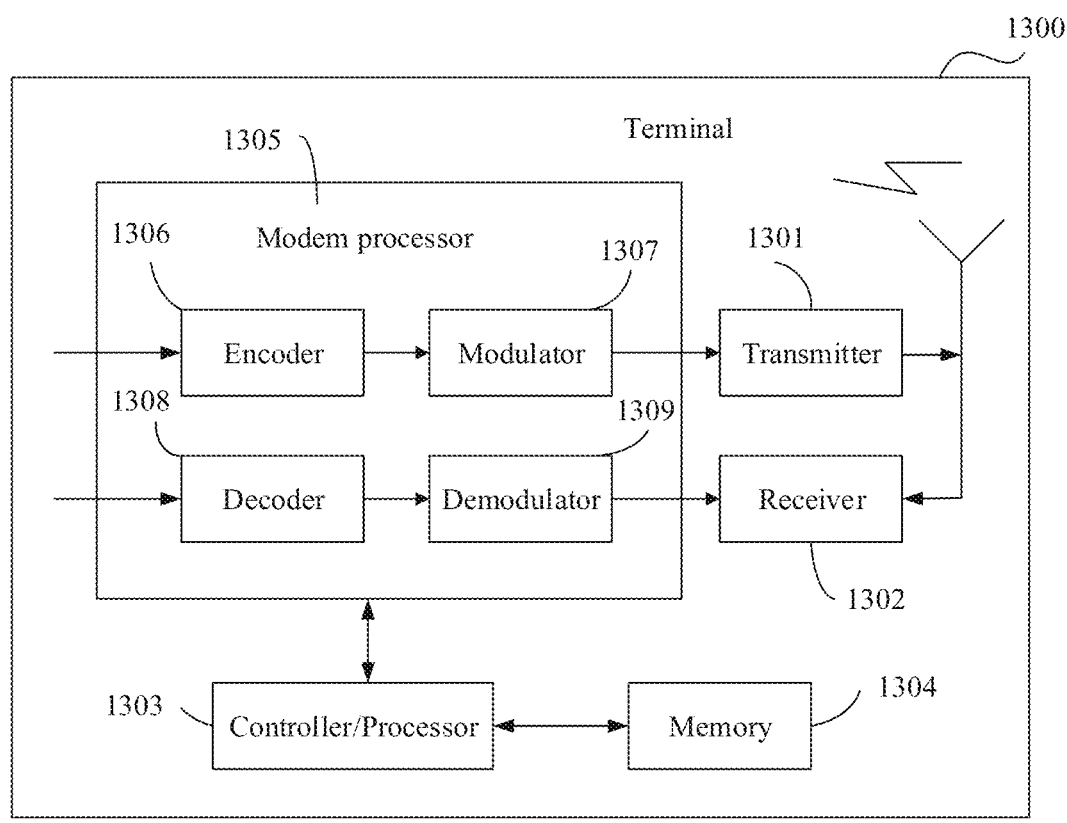
FIG. 13 is a schematic structural diagram of a terminal according to an embodiment of this application.

When the processing unit 1202 is a processor, the communications unit 1203 is a transceiver, and the storage unit 1201 is a memory, the apparatus 1200 in this embodiment of this application may be a terminal shown in FIG. 13.

FIG. 13 is a simplified schematic diagram of a possible design structure of a terminal according to an embodiment of this application. The terminal 1300 includes a transmitter 1301, a receiver 1302, and a processor 1303. The processor 1303 may alternatively be a controller, and is represented as a "controller/processor 1303" in FIG. 13. Optionally, the terminal 1300 may further include a modem processor 1305. The modem processor 1305 may include an encoder 1306, a modulator 1307, a decoder 1308, and a demodulator 1309.

In an example, the transmitter 1301 adjusts (for example, analog-converts, filters, amplifies, and up-converts) an output sample and generates an uplink signal. The uplink signal is transmitted to the base station in the foregoing embodiments by using an antenna. On a down link, the antenna receives a downlink signal transmitted by the base station in the foregoing embodiments. The receiver 1302 adjusts (for example, filters, amplifies, down-converts, and digitizes) a signal received from the antenna, and provides an input sample. In the modem processor 1305, the encoder 1306 receives service data and a signaling message that are to be sent on an up link, and processes (for example, formats, encodes, and interleaves) the service data and the signaling message. The modulator 1307 further processes (for example, symbol-maps and modulates) encoded service data and an encoded signaling message and provides an output sample. The demodulator 1309 processes (for example, demodulates) the input sample and provides symbol estimation. The decoder 1308 processes (for example, de-interleaves and decodes) the symbol estimation and provides decoded data and a decoded signaling message that are to be sent to the terminal 1300. The encoder 1306, the modulator 1307, the demodulator 1309, and the decoder 1308 may be implemented by a combined modem processor 1305. These units perform processing based on a radio access technology (for example, an access technology in LTE, 5G, and another evolved system) used by a radio access network. It needs to be noted that when the terminal 1300 does not include the modem processor 1305, the foregoing functions of the modem processor 1305 may also be implemented by the processor 1303.

The processor 1303 controls and manages an action of the terminal 1300, and is configured to perform a processing process performed by the terminal 1300 in the foregoing embodiments of this application. For example, the processor 1303 is further configured to perform the processing processes of the terminal in the methods shown in FIG. 3A to FIG. 9 and/or another process of the technical solutions described in this application.

Further, the terminal 1300 may further include a memory 1304. The memory 1304 is configured to store program code and data that are used for the terminal 1300.

Methods or algorithm steps described in combination with the content disclosed in the embodiments of this application may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a control plane entity of a centralized unit, a user plane entity of the centralized unit, a terminal, or a unified data storage network element. Certainly, the processor and the storage medium may exist in the control plane entity of the centralized unit, the user plane entity of the centralized unit, the terminal, or the unified data storage network element as discrete components.

A person skilled in the art needs to be aware that in the foregoing one or more examples, functions described in the embodiments of this application may be implemented by hardware, software, firmware, or any combination thereof. When implemented by the software, the foregoing functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a general-purpose or special-purpose computer.

In the foregoing specific implementations, the objectives, technical solutions, and beneficial effects of the embodiments of this application are further described in detail. It needs to be understood that the foregoing descriptions are merely specific implementations of the embodiments of this application, but are not intended to limit the protection scope of the embodiments of this application. Any modification, equivalent replacement, or improvement made based on the technical solutions of the embodiments of this application shall fall within the protection scope of the embodiments of this application.

What is claimed is:

1. A key generation method, applied to a first base station comprising a first centralized unit, which comprises a control plane entity and a user plane entity, and a first distributed unit, wherein the method comprises:
    obtaining, by the control plane entity of the first centralized unit, a root key;
    selecting, by the control plane entity of the first centralized unit, a first security algorithm based on an algorithm priority list of the user plane entity of the first centralized unit, wherein the algorithm priority list comprises the first security algorithm;
    generating, by the control plane entity of the first centralized unit, a first user plane security key based on the root key and the first security algorithm, wherein the first user plane security key is a user plane security key used between the user plane entity of the first centralized unit and a terminal, the first user plane security key comprises at least one of a first user plane encryption key or a first user plane integrity key, and the first security algorithm is a security algorithm used between the user plane entity of the first centralized unit and the terminal; and
    sending, by the control plane entity of the first centralized unit, the first user plane security key to the user plane entity of the first centralized unit.

2. The method according to claim 1, wherein the generating the first user plane security key based on the root key further comprises:
    generating, by the control plane entity of the first centralized unit, the first user plane security key based on the root key, the first security algorithm and at least one of an identifier of the user plane entity of the first centralized unit, an identifier of the first distributed unit, bearer information, session information, and tunnel endpoint identifier (TEID) information, wherein the first security algorithm is a security algorithm used between the user plane entity of the first centralized unit and the terminal.

3. The method according to claim 1, wherein one of the following situations (a)-(b) exists:
    (a) the algorithm priority list is stored in the control plane entity of the first centralized unit; or
    (b) the algorithm priority list is stored in the user plane entity of the first centralized unit; and the method further comprises: receiving, by the control plane entity of the first centralized unit, the algorithm priority list from the user plane entity of the first centralized unit.

4. The method according to claim 3, wherein before receiving the algorithm priority list from the user plane entity of the first centralized unit, the method further comprises:
    requesting, by the control plane entity of the first centralized unit, the algorithm priority list from the user plane entity of the first centralized unit.

5. The method according to claim 2, further comprising:
    sending, by the control plane entity of the first centralized unit to the terminal, a parameter used to generate the first user plane security key, wherein the parameter comprises at least one of the following: the first security algorithm, the identifier of the user plane entity of the first centralized unit, the identifier of the first distributed unit, the bearer information, the session information, and the TEID information.

6. The method according to claim 1, wherein the root key is of the control plane entity of the first centralized unit, and the obtaining the root key comprises one of the following (a)-(b):
   (a) receiving, by the control plane entity of the first centralized unit, the root key that is of the control plane entity of the first centralized unit and that is from a control plane entity of a second centralized unit; or
   (b) receiving, by the control plane entity of the first centralized unit, a root key of the first base station from a control plane entity of a second centralized unit, and generating the root key of the control plane entity of the first centralized unit based on the root key of the first base station; and
   wherein the second centralized unit is a centralized unit comprised in a second base station.

7. The method according to claim 1, wherein the root key is of the first base station, and the obtaining the root key comprises:
   receiving, by the control plane entity of the first centralized unit, the root key of the first base station from a control plane entity of a second centralized unit, wherein the second centralized unit is a centralized unit comprised in a second base station.

8. A key generation method, applied to a first base station that comprises a first centralized units which comprises a control plane entity and a user plane entity, and a first distributed unit, wherein the method comprises:
   receiving, by the user plane entity of the first centralized unit, a first user plane security key from the control plane entity of the first centralized unit, wherein the first user plane security key is a user plane security key used between the user plane entity of the first centralized unit and a terminal, and the first user plane security key comprises at least one of a first user plane encryption key and a first user plane integrity keys,
   wherein the first user plane security key is generated based on a root key and a first security algorithm used between the user plane entity of the first centralized unit and the terminal, and
   wherein the first security algorithm is comprised in an algorithm priority list of the user plane entity of the first centralized unit.

9. The method according to claim 8, wherein the first user plane security key is generated based on the root key and the first security algorithm and at least one of an identifier of the user plane entity of the first centralized unit, an identifier of the first distributed unit, bearer information, session information, and tunnel endpoint identifier (TEID) information.

10. The method according to claim 8, wherein one of the following situations (a)-(b) exists:
    (a) the algorithm priority list is stored in the control plane entity of the first centralized unit; or
    (b) the algorithm priority list is stored in the user plane entity of the first centralized unit; and the method further comprises: sending, by the user plane entity of the first centralized unit, the algorithm priority list to the control plane entity of the first centralized unit.

11. The method according to claim 10, wherein before sending the algorithm priority list to the control plane entity of the first centralized unit, the method further comprises:
    receiving, by the user plane entity of the first centralized unit, a request from the control plane entity of the first centralized unit, wherein the request is used to request the algorithm priority list.

12. The method according to claim 8, wherein the root key is of the first base station or of the control plane entity of the first centralized unit.

13. A control plane entity of a first centralized unit comprised in a base station, the base station further comprising a first distributed unit, the control plane entity comprising:
    at least one processor; and
    a memory coupled to the at least one processor and having program instructions stored thereon which, when executed by the at least one processor, cause the control plane entity to:
    obtain a root key;
    select a first security algorithm based on an algorithm priority list of a user plane entity of the first centralized unit, wherein the algorithm priority list comprises the first security algorithm;
    generate a first user plane security key based on the root key and the first security algorithm, wherein the first user plane security key is a user plane security key used between the user plane entity of the first centralized unit and a terminal, and the first user plane security key comprises at least one of a first user plane encryption key or a first user plane integrity key; and
    send the first user plane security key to the user plane entity of the first centralized unit.

14. The control plane entity according to claim 13, wherein the instructions further cause the control plane entity to:
    generate the first user plane security key based on the root key and the first security algorithm and at least one of an identifier of the user plane entity of the first centralized unit, an identifier of the first distributed unit, bearer information, session information, and tunnel endpoint identifier (TEID) information.

15. The control plane entity according to claim 13, wherein the algorithm priority list is stored in the control plane entity of the first centralized unit.

16. The control plane entity according to claim 13, wherein the algorithm priority list is stored in the user plane entity of the first centralized unit; and the instructions further cause the control plane entity to:
    request the algorithm priority list from the user plane entity of the first centralized unit; and
    receive the algorithm priority list from the user plane entity of the first centralized unit.

17. The control plane entity according to claim 14, wherein the instructions further cause the control plane entity to:
    send a parameter used to generate the first user plane security key to the terminal, wherein the parameter comprises at least one of the following: the first security algorithm, the identifier of the user plane entity of the first centralized unit, the identifier of the first distributed unit, the bearer information, the session information, and the TEID information.

* * * * *